(12) United States Patent
Dilluvio

(10) Patent No.: US 7,690,716 B2
(45) Date of Patent: Apr. 6, 2010

(54) CONVERTIBLE ROOF

(75) Inventor: Christopher J. Dilluvio, Farmington Hills, MI (US)

(73) Assignee: Specialty Vehicle Acquisition Corp., Los Angeles, CA (US)

( * ) Notice: Subject to any disclaimer, the term of this patent is extended or adjusted under 35 U.S.C. 154(b) by 295 days.

(21) Appl. No.: 11/805,404

(22) Filed: May 23, 2007

(65) Prior Publication Data

US 2007/0284909 A1   Dec. 13, 2007

Related U.S. Application Data

(60) Provisional application No. 60/803,015, filed on May 23, 2006.

(51) Int. Cl.
*B60J 7/00* (2006.01)
(52) U.S. Cl. ............ 296/107.09; 296/107.01; 296/108; 296/121
(58) Field of Classification Search ........... 296/107.01, 296/108, 116, 121, 107.08, 107.09, 107.15, 296/123
See application file for complete search history.

(56) References Cited

U.S. PATENT DOCUMENTS

| | | |
|---|---|---|
| 1,294,148 A | 2/1919 | Oliver |
| 1,426,129 A | 8/1922 | Velo |
| 1,463,193 A | 7/1923 | Botella |
| 2,193,091 A | 3/1940 | Fish |
| 2,267,471 A | 12/1941 | Keller |
| 2,592,512 A | 4/1952 | Fodermaier Jr. |
| 2,768,857 A | 10/1956 | Albrecht |
| 2,794,672 A | 6/1957 | Burzi |
| 3,002,785 A | 10/1961 | Larché |
| 3,159,422 A | 12/1964 | Lautenbach |
| 3,473,842 A | 10/1969 | Bracey et al. |
| 3,536,354 A | 10/1970 | Ingram |
| 4,573,732 A | 3/1986 | Muscat |
| 4,711,485 A | 12/1987 | Maebayashi et al. |
| 4,720,133 A | 1/1988 | Alexander et al. |
| 4,720,134 A | 1/1988 | Seifert |
| 4,741,571 A | 5/1988 | Godette |
| 4,778,215 A | 10/1988 | Ramaciotti |

(Continued)

FOREIGN PATENT DOCUMENTS

FR   459.931   11/1913

(Continued)

OTHER PUBLICATIONS

"Dream Wheels, Toyota Lets Automotive Creativity Run Free at SEMA 2007," This Week From Toyota, AutoWeek, Advertisement Oct. 22, 2007.

(Continued)

*Primary Examiner*—Lori L Lyjak
(74) *Attorney, Agent, or Firm*—Harness, Dickey & Pierce, P.L.C.

(57) ABSTRACT

A convertible roof for an automotive vehicle is provided. In another aspect of the present invention, an in-folding convertible roof is employed. A further aspect of the present invention includes at least a partially self-covering convertible roof system which includes at least one side rail that moves in a generally cross-vehicular direction when the roof is raised or lowered.

39 Claims, 14 Drawing Sheets

U.S. PATENT DOCUMENTS

| | | | |
|---|---|---|---|
| 4,784,428 A | 11/1988 | Moy et al. | |
| 4,828,317 A | 5/1989 | Muscat | |
| 4,840,419 A | 6/1989 | Kolb | |
| 4,929,015 A * | 5/1990 | Bauer | 296/116 |
| 4,958,882 A | 9/1990 | Kolb | |
| 5,004,291 A | 4/1991 | Bauer et al. | |
| 5,026,110 A | 6/1991 | Koop et al. | |
| 5,033,789 A | 7/1991 | Hayashi et al. | |
| 5,118,158 A | 6/1992 | Truskolaski | |
| 5,209,544 A | 5/1993 | Benedetto et al. | |
| 5,251,952 A | 10/1993 | Guckel et al. | |
| 5,301,987 A | 4/1994 | Tokarz et al. | |
| 5,427,429 A | 6/1995 | Piontek et al. | |
| 5,429,409 A | 7/1995 | Corder et al. | |
| 5,456,516 A | 10/1995 | Alexander et al. | |
| 5,542,735 A | 8/1996 | Furst et al. | |
| 5,593,202 A | 1/1997 | Corder et al. | |
| 5,624,149 A | 4/1997 | Tokarz | |
| 5,625,981 A | 5/1997 | Klein et al. | |
| 5,678,881 A | 10/1997 | Tokarz | |
| 5,685,596 A | 11/1997 | Tokarz et al. | |
| 5,743,587 A | 4/1998 | Alexander et al. | |
| 5,758,923 A | 6/1998 | Kolb | |
| 5,765,904 A | 6/1998 | Aydt et al. | |
| 5,769,483 A | 6/1998 | Danzl et al. | |
| 5,779,299 A | 7/1998 | Purcell et al. | |
| 5,785,375 A | 7/1998 | Alexander et al. | |
| 5,810,422 A | 9/1998 | Corder et al. | |
| 5,903,119 A * | 5/1999 | Laurain et al. | 296/107.09 |
| 5,944,375 A | 8/1999 | Schenk et al. | |
| 6,033,008 A | 3/2000 | Mattila | |
| 6,042,174 A | 3/2000 | Durrani | |
| 6,237,986 B1 | 5/2001 | Neubrand et al. | |
| 6,328,372 B1 | 12/2001 | Just | |
| 6,390,531 B1 | 5/2002 | Schütt | |
| 6,398,296 B1 | 6/2002 | Mayer | |
| 6,412,860 B1 | 7/2002 | Reinsch | |
| 6,416,111 B1 | 7/2002 | Neubrand | |
| 6,416,121 B1 | 7/2002 | Miklosi | |
| 6,419,295 B1 | 7/2002 | Neubrand | |
| 6,428,090 B1 | 8/2002 | Reinsch | |
| 6,454,342 B2 | 9/2002 | Heselhaus et al. | |
| 6,464,284 B2 | 10/2002 | Neubrand | |
| 6,520,560 B2 | 2/2003 | Schütt et al. | |
| 6,550,842 B1 | 4/2003 | Halbweiss et al. | |
| 6,561,566 B2 | 5/2003 | Dintner et al. | |
| 6,568,751 B2 | 5/2003 | Reinsch | |
| 6,623,065 B2 | 9/2003 | Halbweiss et al. | |
| 6,666,494 B2 | 12/2003 | Antreich | |
| 6,722,723 B2 | 4/2004 | Obendiek | |
| 6,729,672 B2 | 5/2004 | Neubrand | |
| 6,755,457 B2 | 6/2004 | Grubbs | |
| RE38,546 E | 7/2004 | Corder et al. | |
| 6,793,267 B2 | 9/2004 | Hesselhaus | |
| 6,802,554 B1 | 10/2004 | Just et al. | |
| 6,863,333 B2 | 3/2005 | Heller et al. | |
| 7,032,951 B2 | 4/2006 | Powell | |
| 7,104,587 B2 | 9/2006 | MacNee, III et al. | |
| 7,118,160 B2 | 10/2006 | Willard | |
| 7,163,255 B2 * | 1/2007 | Rawlings et al. | 296/116 |
| 7,300,095 B2 * | 11/2007 | Rawlings et al. | 296/116 |
| 2002/0125731 A1 | 9/2002 | Hasselgruber et al. | |
| 2003/0038501 A1 | 2/2003 | Heselhaus | |
| 2004/0232721 A1 | 11/2004 | Rawlings et al. | |
| 2005/0140165 A1 | 6/2005 | Heller et al. | |
| 2006/0061129 A1 | 3/2006 | Dilluvio | |
| 2006/0097542 A1 | 5/2006 | Dilluvio | |
| 2006/0152033 A1 | 7/2006 | Schartner et al. | |
| 2008/0284200 A1 | 11/2008 | Dilluvio et al. | |

FOREIGN PATENT DOCUMENTS

| | | |
|---|---|---|
| FR | 1382296 | 12/1964 |
| GB | 727661 | 4/1955 |
| WO | WO0243978 * | 6/2002 |

OTHER PUBLICATIONS

"Drop-top Rolls", Nov. 22, 2004, AutoWeek, p. 4.

MacKenzie, Angus, "Sunshine Superstar", May, 2005, Motor Trend, pp. 74-78.

Vaughn, Mark, "Chrysler 30C Cabriolet", (Newport Convertible Engineering, Inc.), Nov. 22, 2004, AutoWeek, p. 4.

9 photographs of a convertible roof mechanism believed to have been used on Cadillac Eldorado Convertibles for the 1971-1976 model years.

* cited by examiner

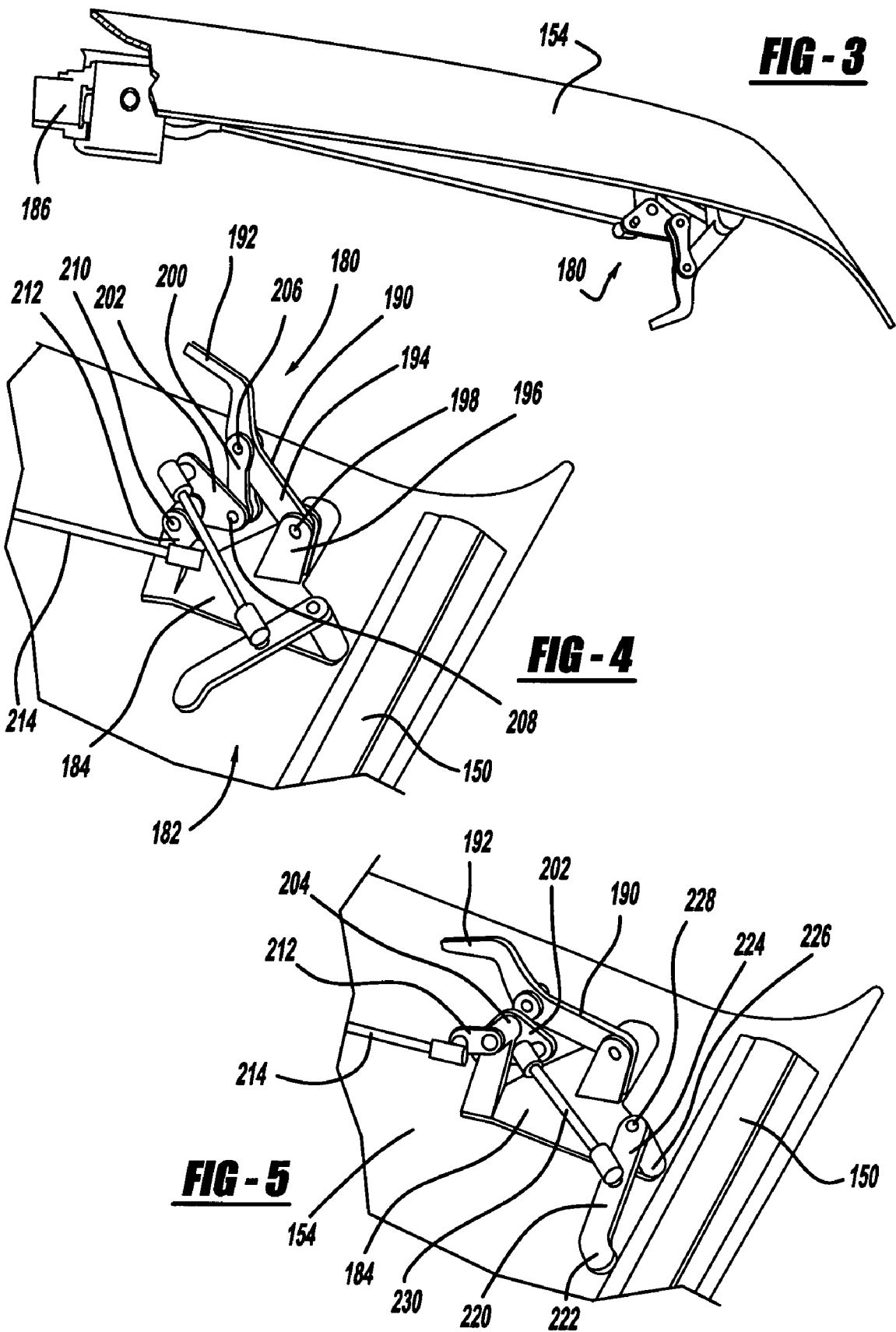

CONVERTIBLE ROOF

CROSS-REFERENCE TO RELATED APPLICATIONS

This application claims priority to U.S. provisional patent application Ser. No. 60/803,015, filed May 23, 2006, which is incorporated by reference herein.

BACKGROUND

The present invention generally relates to convertible roofs and more particularly to a convertible roof system for an automotive vehicle.

Most traditional soft-top convertible roofs for automotive vehicles have a forwardmost or number one roof bow which inverts when moved from it fully raised and closed position above a passenger compartment to its fully stowed and open position rear of a passenger compartment. The inverted number one roof bow, however, presents a somewhat undesirable appearance when open. Such an inverted conventional arrangement can be covered with a manually installed soft boot cover, but the difficulty of installation and storage of the boot cover when the roof is raised usually leads to nonuse of the boot cover. Furthermore, the desire to have a full width rear seating area is often contrary to many convertible roof constructions, especially when the roof is narrow in a cross-vehicle width.

SUMMARY

In accordance with the present invention, a convertible roof for an automotive vehicle is provided. In another aspect of the present invention, an in-folding convertible roof is employed. A further aspect of the present invention includes at least a partially self-covering convertible roof system which includes at least one side rail that moves in a generally cross-vehicular direction when the roof is raised or lowered. In yet another aspect of the present invention, a clam-shell folding and in-folding convertible roof is used.

The convertible roof of the present invention is advantageous over conventional convertible roofs since a full size rear seating area can be achieved regardless of the closed roof width. Furthermore, the partially or fully self-covering construction of the convertible roof of the present invention advantageously improves the aesthetic appearance of the stowed roof, allows for generally horizontal storage of the front roof section, protects the front header latching mechanisms and optional interior fabric mounted to an inside of the front roof section, and minimizes the fore-and-aft size of a moveable cover (such as a tonneau cover or trunk lid) at a centerline of the vehicle. Moreover, the present invention roof is generally flush with the movable cover when stowed thereby improving aesthetics and aerodynamics. The in-folding construction allows for offset stowed packaging of the side rails which must cover a long raised fore-and-aft distance, but without sacrificing seating or trunk compartment (or rear engine compartment) space, unlike some conventional arrangements. Additional advantages and features of the present invention will become apparent from the following description and appended claims, taken in conjunction with the accompanying drawings.

BRIEF DESCRIPTION OF THE DRAWINGS

The soft-top fabric is removed in all but FIG. 1 for ease in viewing the underlying top stack mechanism.

FIG. 3 is a front perspective view showing a front header latching mechanism employed in the preferred convertible roof system;

FIG. 4 is a rear and inside perspective view showing the front header latching mechanism employed in the preferred convertible roof system, in an unlatched orientation;

FIG. 5 is a rear and inside perspective view showing the front header latching mechanism employed in the preferred convertible roof system, in a latched orientation;

DETAILED DESCRIPTION OF THE PREFERRED EMBODIMENT

Figure 1:
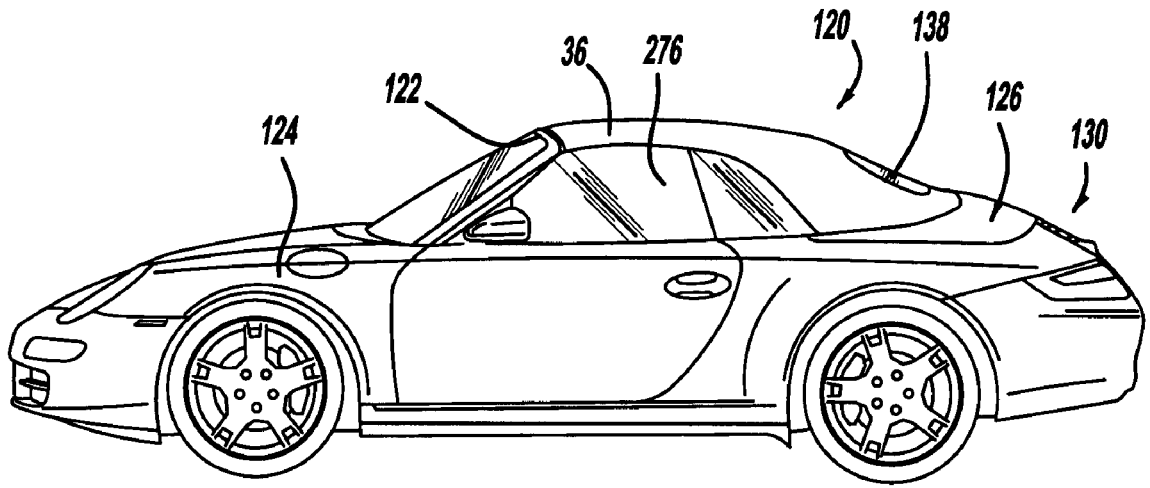
FIG. 1 is a side elevational view showing an automotive vehicle employing the preferred embodiment of a convertible roof system of the present invention, in a fully raised and closed position.

The following description is merely exemplary in nature and is not intended to limit the present disclosure, application, or uses. It should be understood that throughout the drawings, corresponding reference numerals indicate like or corresponding parts and features. Furthermore, only one side of the convertible roof system will be described in detail as the opposite side is essentially a mirrored image thereof. When the terms "horizontal," "vertical," "fore-and-aft" and "cross-vehicle" are used, it should be appreciated that these are general directions as most automotive vehicle parts have some slight curve or deviation from a straight line.

Figure 2:
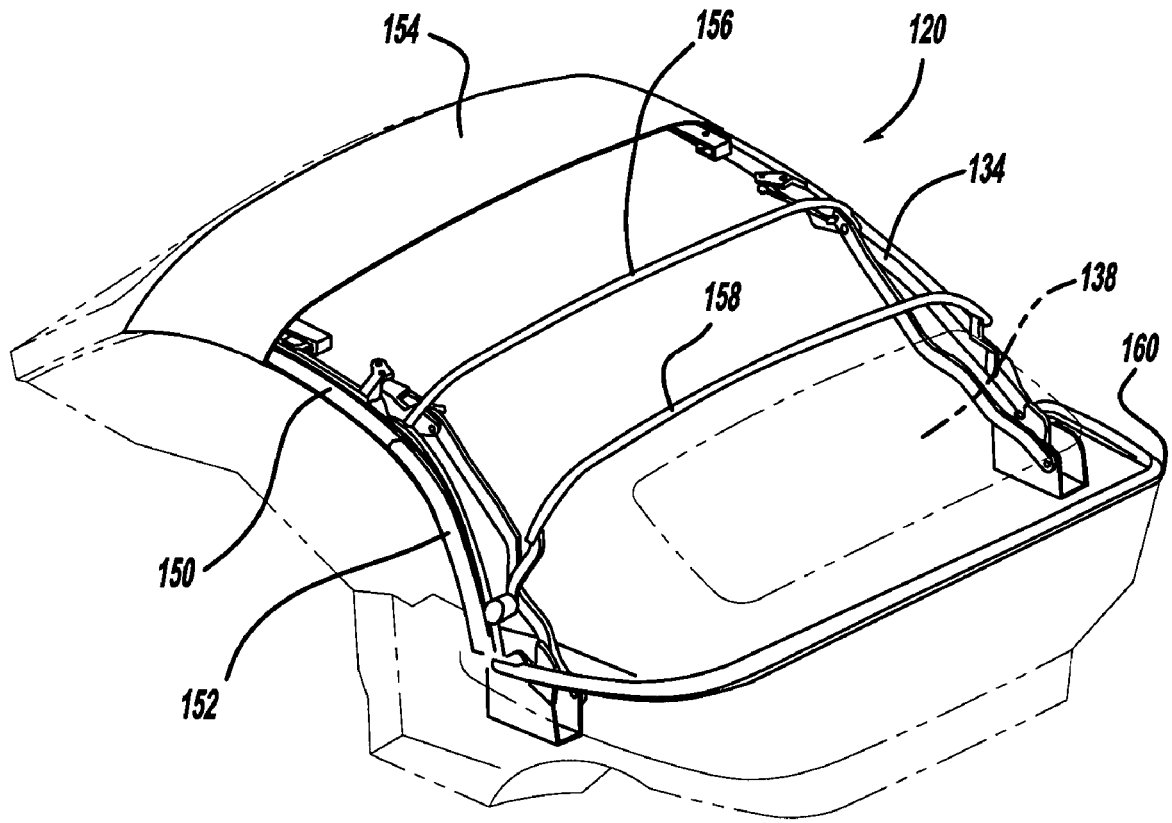
FIG. 2 is a rear perspective view showing the preferred convertible roof system, in the fully raised position.
Figure 12:
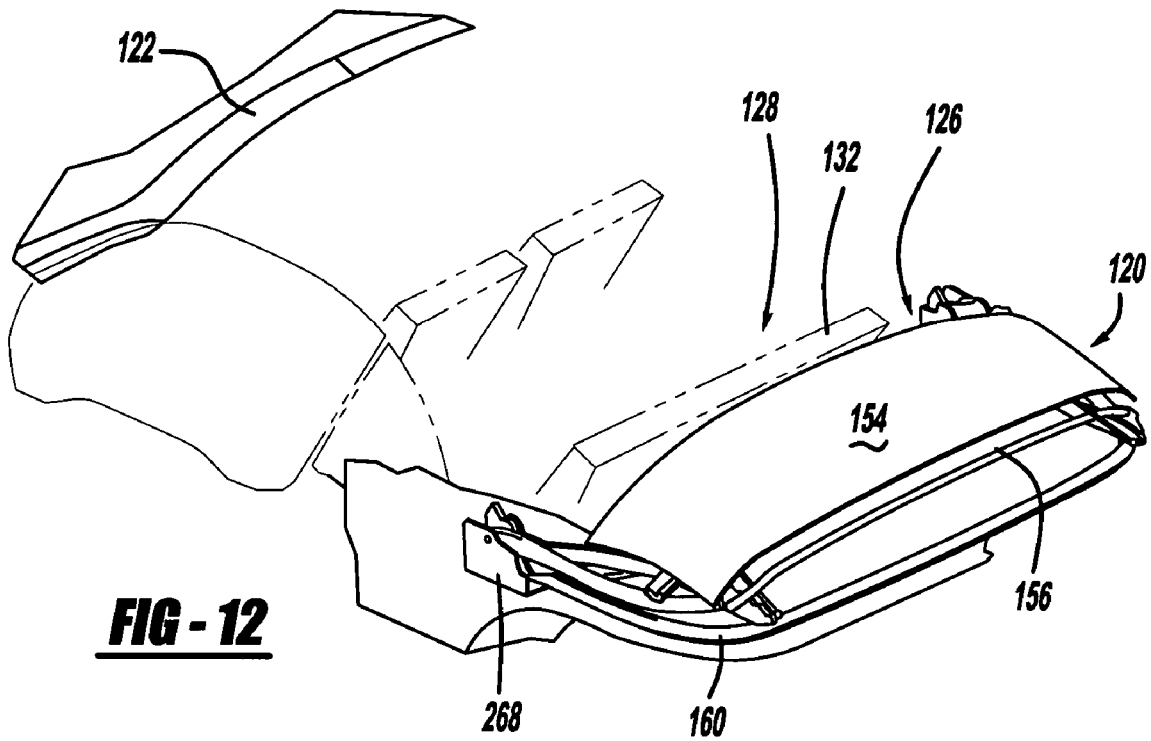
FIG. 12 is a rear perspective view showing the preferred convertible roof system, in a fully stowed position.
Figure 13:
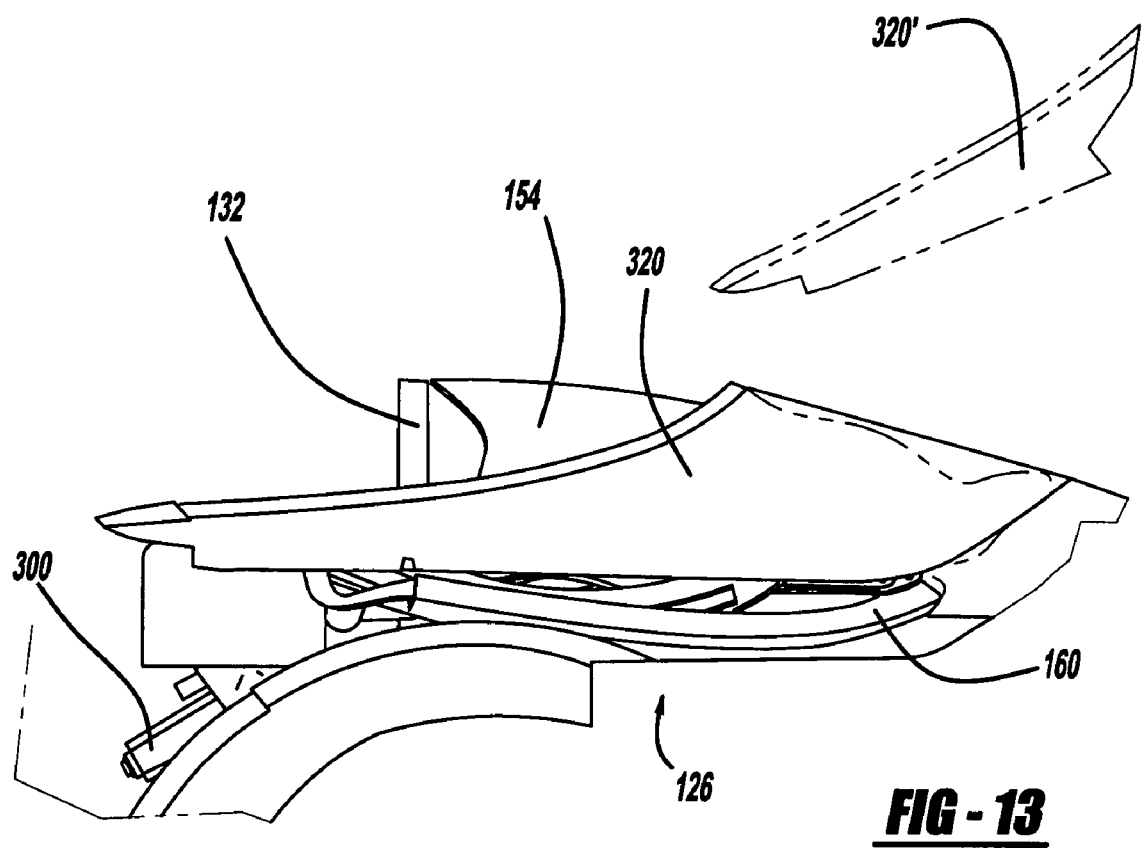
FIG. 13 is a side elevational view showing the preferred convertible roof system, in the fully stowed position.
Figure 14:
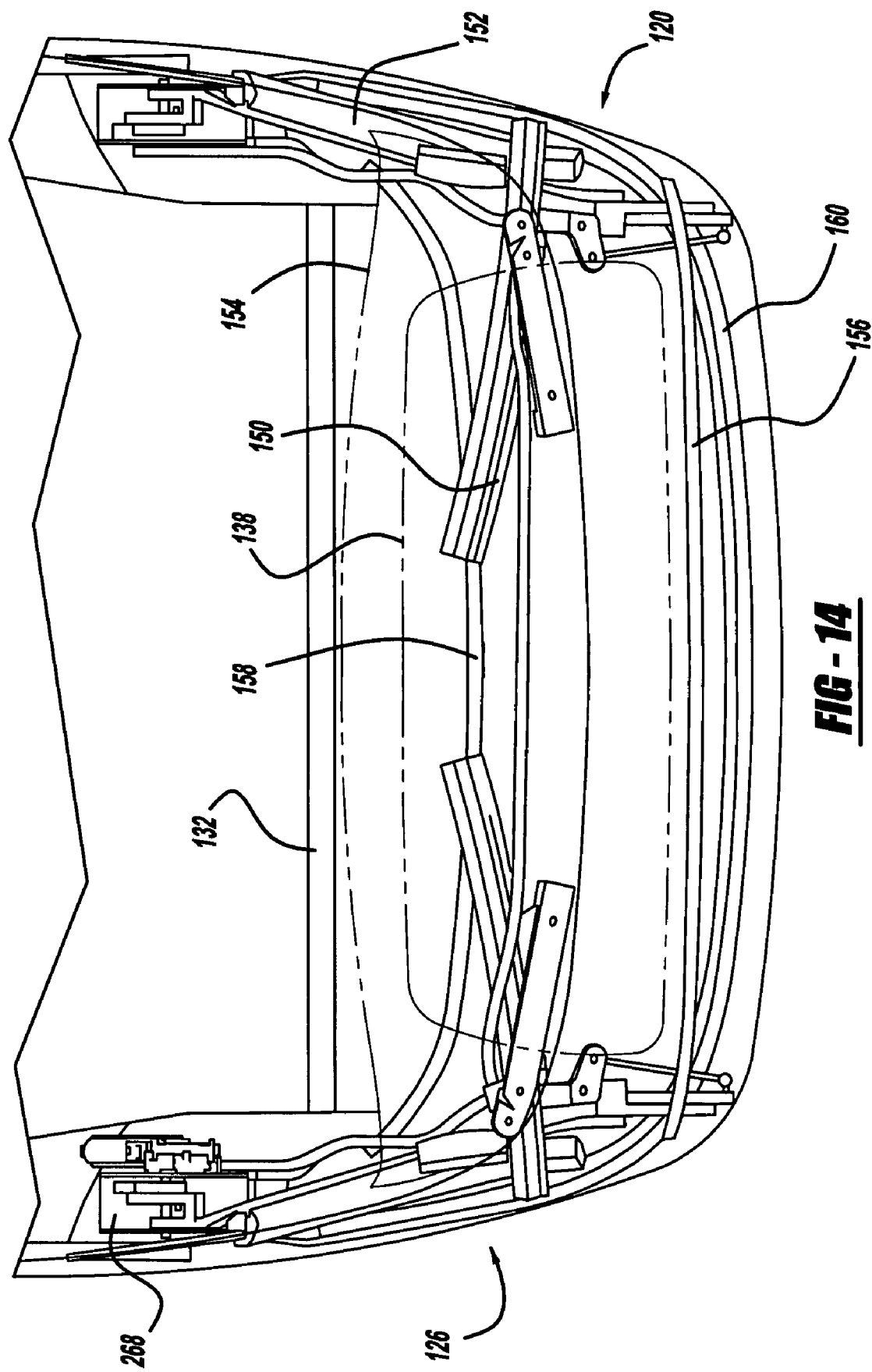
FIG. 14 is a diagrammatic top view showing the preferred convertible roof system, in the fully stowed position.

A preferred embodiment of the present disclosure provides an in-folding convertible roof 120. Convertible roof 120 is movable from a fully raised and closed position, as shown in FIGS. 1 and 2, to a fully stowed and open position, as shown in FIGS. 12-14. In the raised position, convertible roof 120 is latched to a stationary front header panel 122 which is part of a body of an automotive vehicle 124. In its stowed position, convertible roof 120 fits within a roof storage area 126. Roof storage area 126 is preferably rearward of a rear passenger seating area 128 and forward of either a trunk or engine compartment 130, but alternately convertible roof 120 can be stored above a mid or rear engine compartment, or within a rear trunk compartment, although various advantages of the present invention may not be realized. In one vehicle construction, it is envisioned that a bulkhead or other compartmentalizing wall 132 is disposed immediately adjacent a forward edge of the stowed convertible roof 120.

Convertible roof 120 includes a top stack mechanism 134 which is externally covered by a pliable fabric roof cover 36. A rigid glass back window or backlite 138 is attached to a rear section of roof cover 36. Top stack mechanism 134 includes a front side rail 150 and an immediately adjacent rear side rail 152 on each side of the vehicle. An enlarged forwardmost number one roof bow 154 spans between the front side rails 150. Number one roof bow 154 is a rigid metal panel that acts as an underlying hard-top front roof section, essentially taking the place of a conventional number one and number two roof bows. Additionally, a number three roof bow 156, a number four roof bow 158 and a rearmost number five roof bow 160 span between the adjacent side rails and are secured to an interior side of roof cover 36. It should alternately be appreciated that a greater or lesser number of roof bows can be employed depending on the specific vehicle construction.

FIGS. 3-5 illustrate a front header latching mechanism 180 and in-folding locking mechanism 182 employed with the convertible roof. Front header latching mechanism 180 and in-folding locking mechanism 182 are movably mounted to a bracket 184 attached to an interior of number one roof bow 154. An electric motor actuator 186 is centrally mounted on an inside of number one roof bow 154 and automatically drives front header latching mechanism 180 and in-folding locking mechanism 182 on each side of the number one roof bow.

More specifically, front header latching mechanism 180 includes a latch 190 having a hook 192 and a generally straight lever 194. An end of lever 194 is pivotally coupled to an upstanding tab 196 of bracket 184 at a pivot 198. A pair of parallel driving links 200 and a crank 202 rotatably couple a middle of latch 190 to a mounting structure 204 projecting from bracket 184 by way of pivots 206, 208 and 210. An intermediate link 212 rotatably couples pivot 210 to an elongated driving rod 214 moved by gears associated with actuator 186. Furthermore, in-folding locking mechanism 182 includes a contacting or locking arm 220 which has an offset angled contacting end 222 and a generally straight segment 224. An end of straight segment 224 is pivotally coupled to a structure 226 projecting from bracket 184 by way of a pivot 228. An elongated rod 230 has a ball and socket joint pivotally connected to crank 202 and an opposite ball and socket joint pivotally coupled to a middle of contacting arm 220. During operation, actuator 186 causes rotation of crank 202 which in turn, moves latch 190 from the open and disengaged position of FIGS. 3 and 4, to a latching and closed position of FIG. 5, when the convertible roof is fully raised. Hook 192 of latch 190 has an approximately 50 millimeter reach to engage within a receptacle or striker affixed to front header panel 122 (see FIG. 1) of the vehicle body.

Rotation of crank 202 simultaneously causes rod 230 to rotate contacting arm 220 from the disengaged position as shown in FIG. 4, to a contacting and locking position as shown in FIG. 5. In the contacting and locking position, end 222 of contacting arm 220 pushes against an inside surface of front side rail 150 to deter generally cross-vehicle rotation of front side rail 50 relative to number one roof bow 154. This contacting arm engagement with the front side rail, or a member associated therewith, serves to lock the A-joint of the convertible roof when the roof is fully raised, thereby improving structural integrity of the roof. Disengagement of contacting arm 220 allows in-folding movement of front side rail 150 and parts associated therewith. When the header latch is in its fully engaged position, the latch is generally in an over-center condition as is the in-fold lock. It should further be appreciated that a lost-motion slot or cam can alternately be provided to allow for some movement of the header latch prior to or after movement of the contacting arm.

Referring to FIGS. 6-11, top stack mechanism 134 further includes an in-folding link 260, a synchronizer link 262, an in-folding mechanism base bracket link 264, a balance link 266 and a main pivot bracket 268. Furthermore, a weatherstrip 270 is stationarily affixed to an inside of number one roof bow 154 adjacent each front side thereof. Another weatherstrip 272 is affixed to a lower and outside surface of each front side rail 150 by way of a carrier and an additional weatherstrip 274 is affixed to an outside and bottom side surface of rear side roof rail 152 also via a carrier. These weatherstrips seal against the side windows 276 (see FIG. 1) of the vehicle when the convertible roof is in its raised position and the side windows are also in their fully raised positions.

Each in-folding link 260 has a forward edge rotatably affixed to number one roof bow 154, or an attachment thereto. An intermediate pivot of each in-folding link 260 is also rotatably coupled to synchronizer link 262 which is elongated in a generally cross-vehicle direction. A rear end of each in-folding link 260 is coupled to a flange 280, projecting inwardly from front side rail 150 at a pivot 282. Base bracket link 264 has a predominantly vertically elongated pivot 284 coupled to a rear projection 286 of each front side rail 150. Furthermore, a fulcrum pivot 288 of link 264 is pivotally connected to a distal end of rear roof rail 152 while a rear pivot 290 of link 264 is pivotally coupled to balance link 266 near a distal end thereof. Pivots 288 and 290 are elongated in a primarily cross-car and horizontal direction. An in-folding coupler link 292 has a front ball and socket joint 294 rotatably coupled to arm 286 of front side rail 150, and a rear ball and socket joint 296 rotatably coupled to a distal end of balance link 266. Moreover, an end of number three roof bow 156 is stationarily affixed to link 264, although it will alternately be appreciated that number three roof bow 156 can be pivotally coupled to link 264 or rear side rail 152 although various advantages of the preferred embodiment may not be realized.

Additionally, number four roof bow 158 (see FIG. 2) pivots directly off of rear side rails 152 and is passively controlled by movement of roof cover 36 (see FIG. 1). Similarly, number five roof bow 160 pivots directly off of a lower section of rear side rails 152 and is passively controlled by movement of roof cover 36. Two steel cables extend from number five roof bow 160 to the vehicle body in order to tension roof cover 36. It is also noteworthy that number three roof bow 156 advantageously provides a stable cross-vehicle connection between the right and left in-folding mechanism, base bracket links 264 thereby serving as a structurally stable platform from which the in-folding front side rails 150, in-folding links 260 and number one roof bow 154 can move during retraction. Essentially, components 264, 266, 292 and 286 create a three-dimensional four bar linkage mechanism. The in-folding mechanism is essentially a planar seven bar in-folding mechanism. The side rails are preferably made from forged aluminum, and magnesium die cast seal carriers retain the weatherstrips to the side rails.

Figure 15:
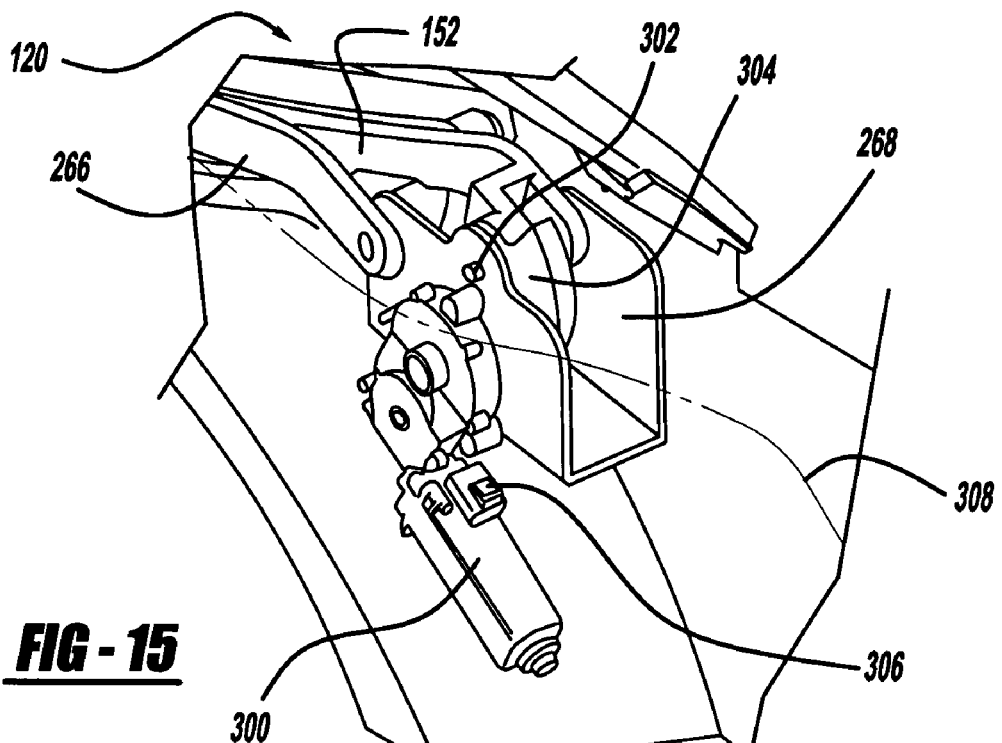
FIG. 15 is a rear perspective view showing an actuator and a main body joint employed in the preferred convertible roof system.
Figure 16:
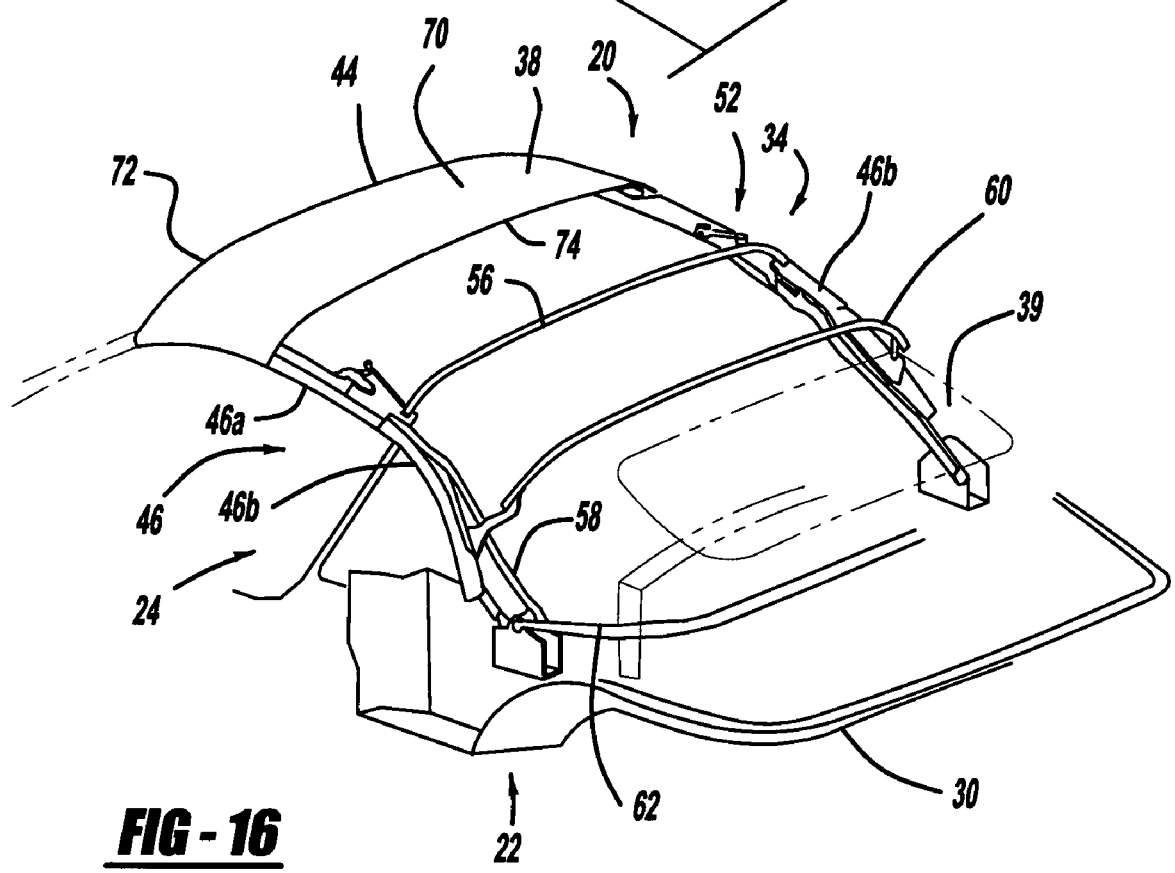
FIG. 16 is a rear perspective view showing an alternate embodiment of a convertible roof system of the present invention, in a fully raised position.
Figure 17:
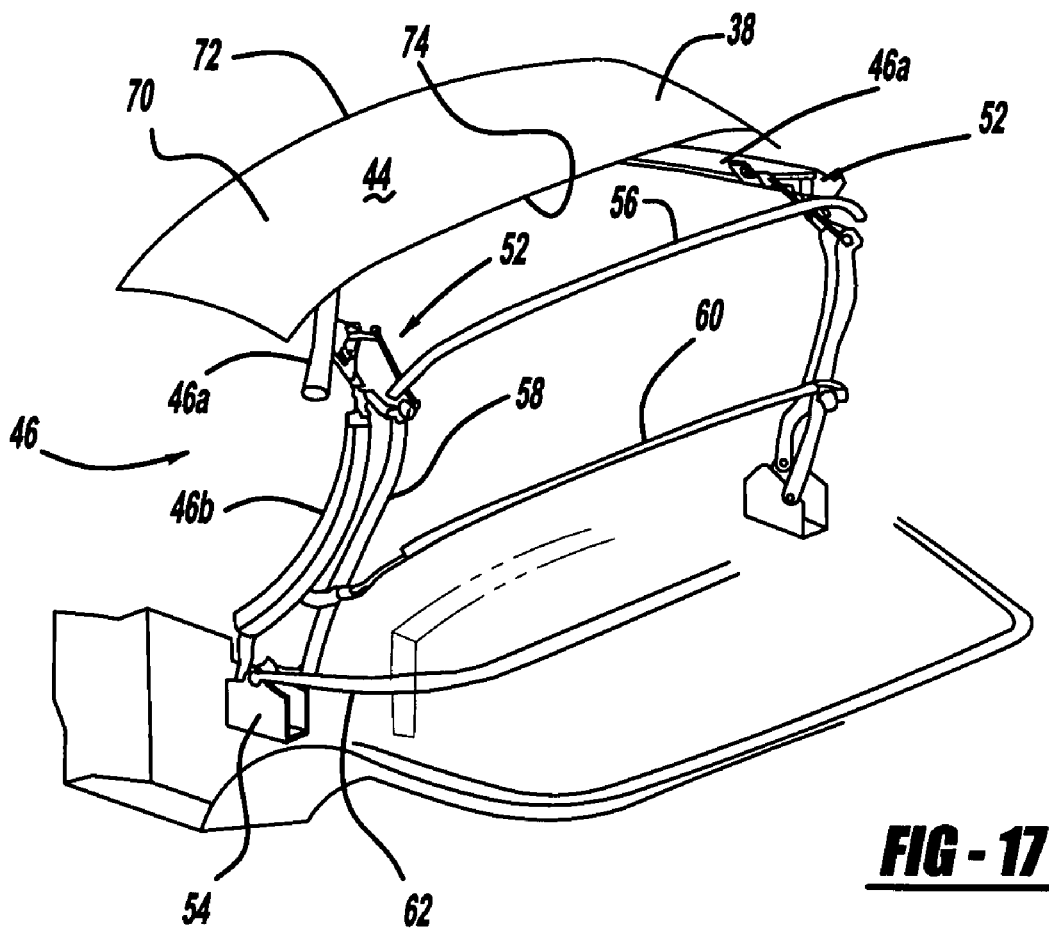
FIG. 17 is a rear perspective view of the alternate convertible roof system of FIG. 16, in an intermediate position between the raised position and a stowed position.
Figure 18:
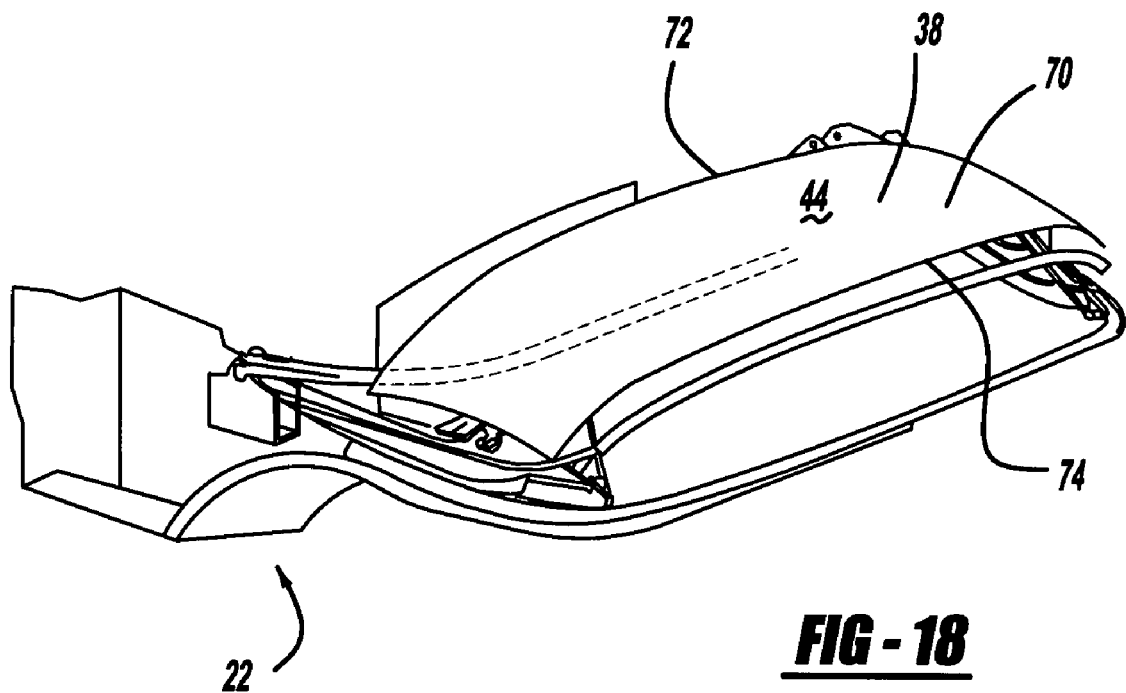
FIG. 18 is a rear perspective view of the alternate convertible roof system of FIG. 16, in the fully stowed position.
Figure 19:
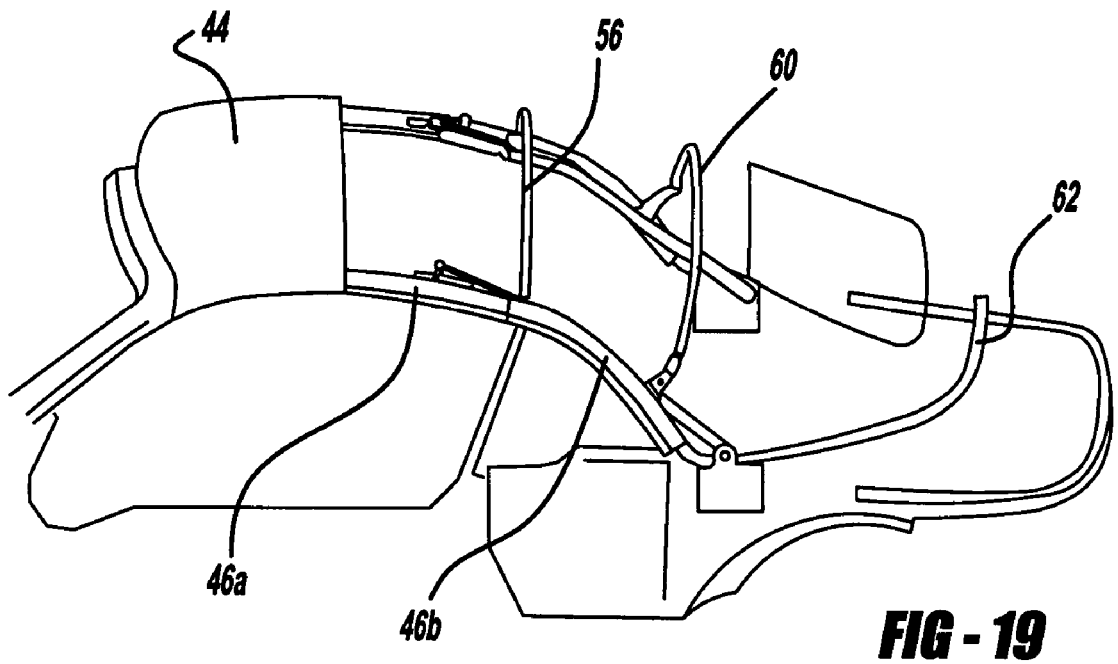
FIG. 19 is a side perspective view showing the alternate convertible roof system, in the fully raised position.
Figure 20:
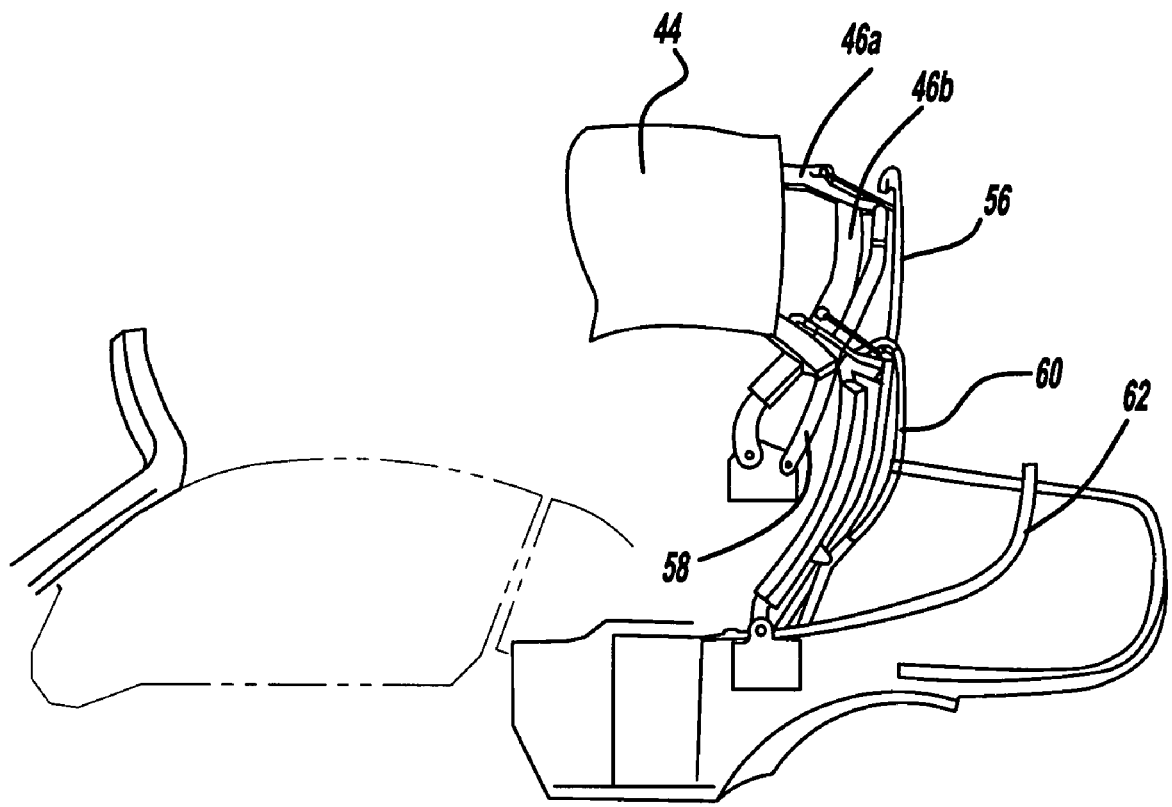
FIG. 20 is a side perspective view showing the alternate convertible roof system, in the intermediate position.
Figure 21:
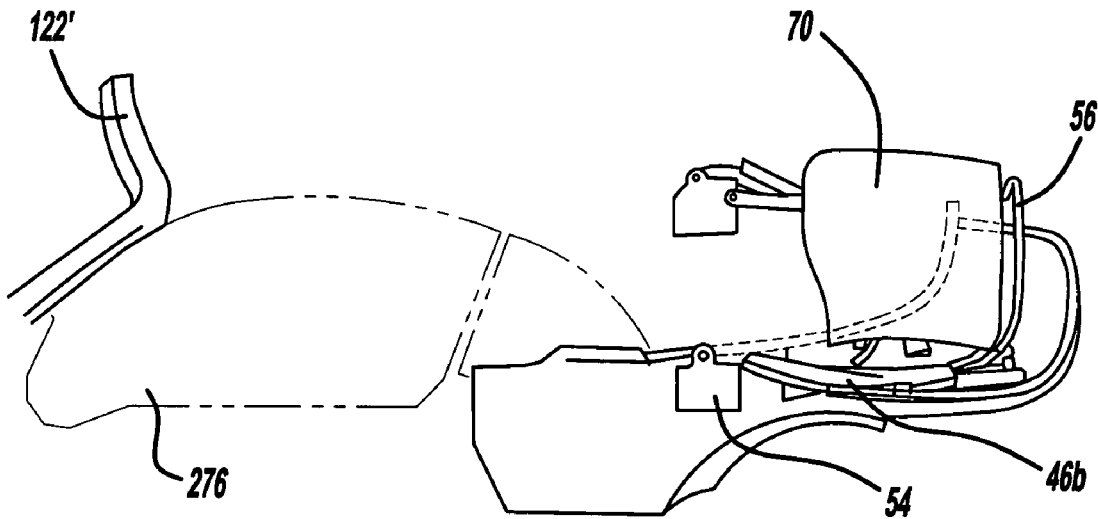
FIG. 21 is a side perspective view showing the alternate convertible roof system, in the fully stowed position.
Figure 22:
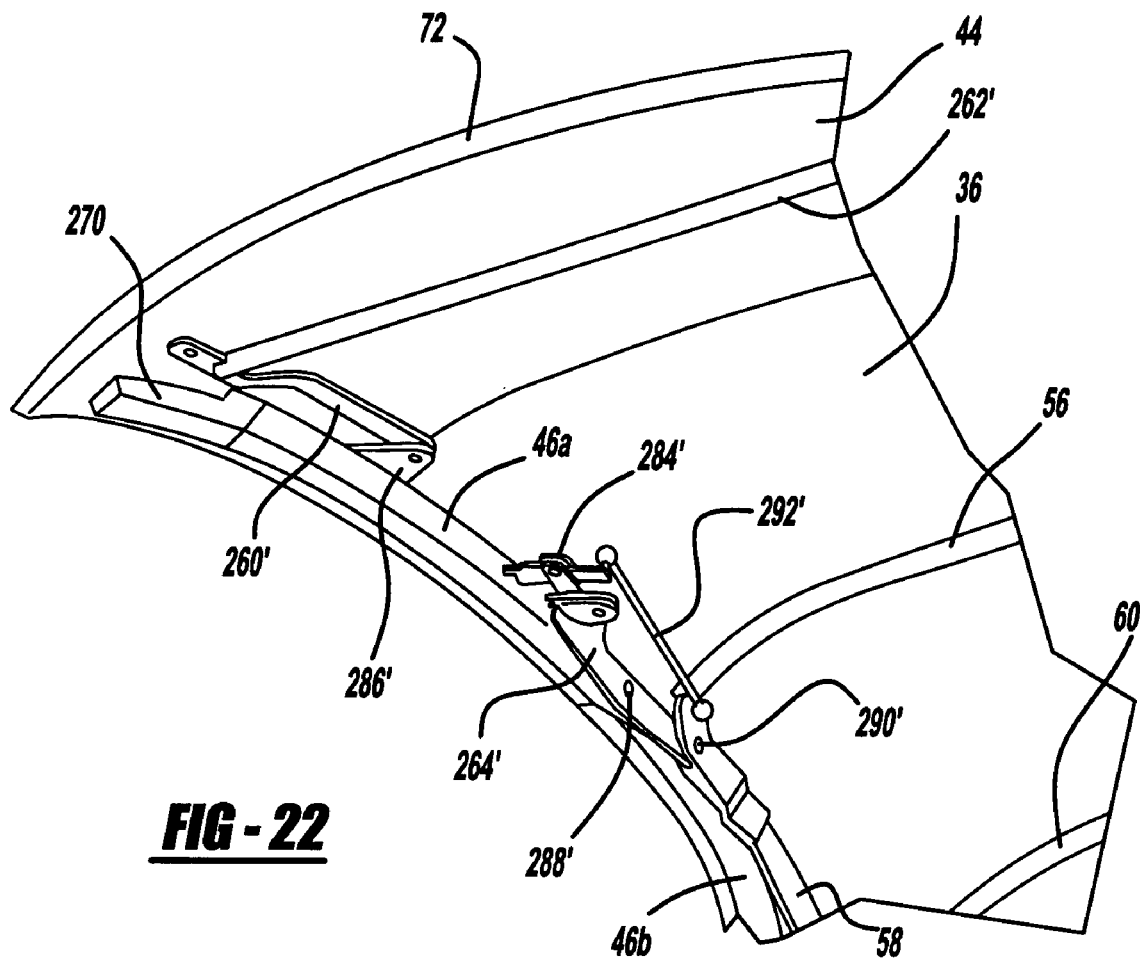
FIG. 22 is an inside and front perspective view showing the alternate convertible roof system, in the fully raised position.
Figure 23:
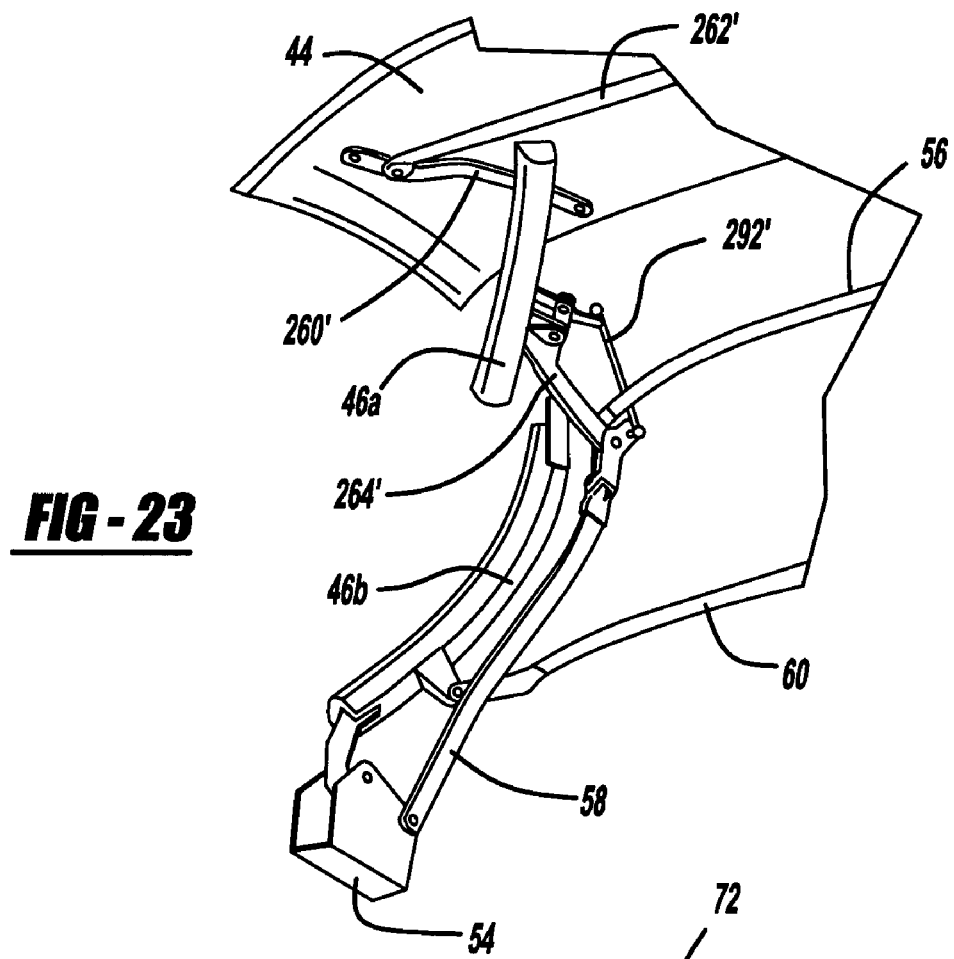
FIG. 23 is an inside and front perspective view showing the alternate convertible roof system, in the intermediate position.
Figure 24:
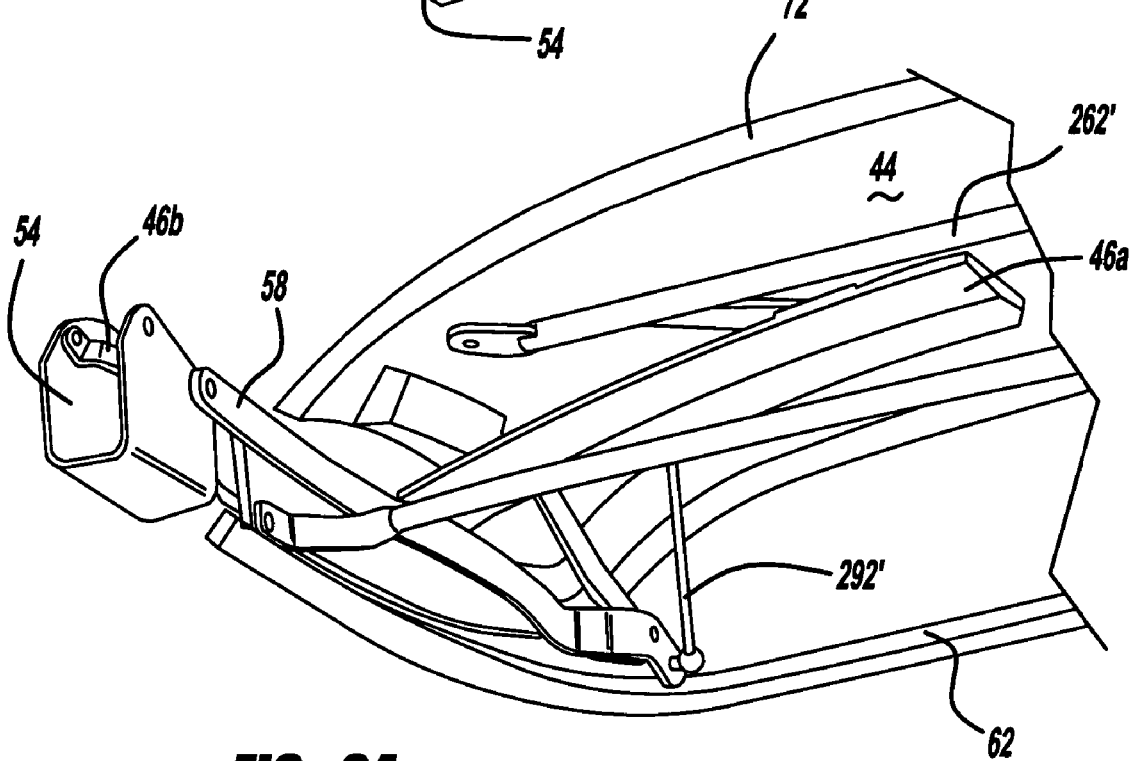
FIG. 24 is an inside and front perspective view showing the alternate convertible roof system, in the fully stowed position.
Figure 25:
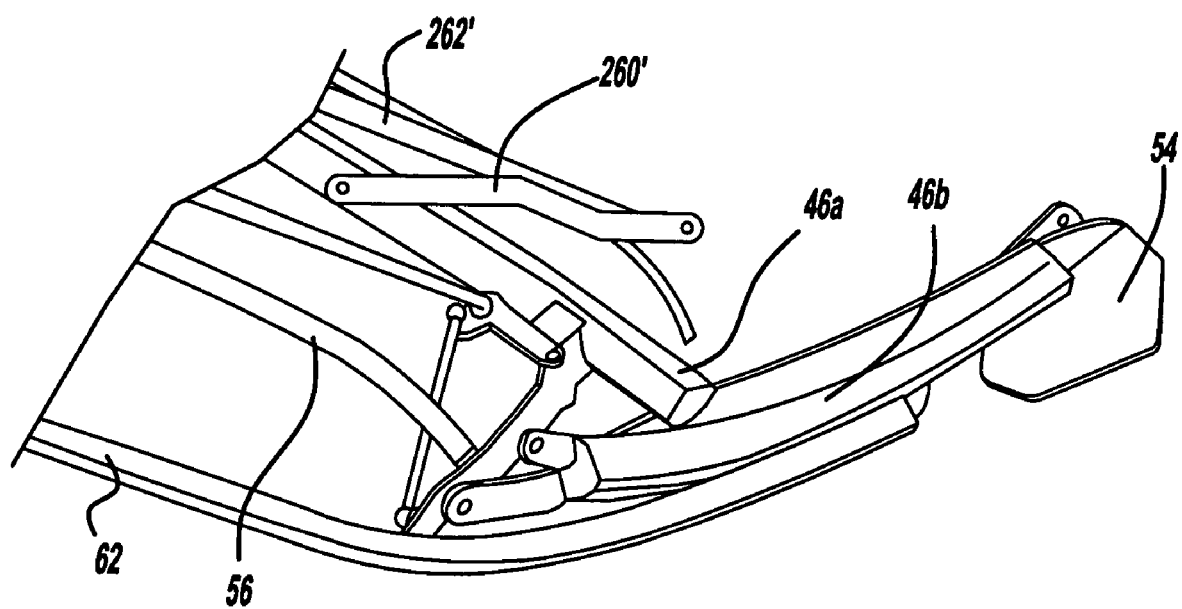
FIG. 25 is an outside and rear perspective view showing the alternate convertible roof system, in the fully stowed position.

FIG. 15 illustrates an automatic actuator 300 for operably driving top stack mechanism 134 between its raised and stowed positions, and vice versa. Actuator 300 is preferably an electric motor with an associated gear box which directly drives a main pivot 302 of rear side rail 152 through a sector gear 304. A simple electrical connection 306 is provided for the electric motor such that no drive cables or hydraulic hoses need to be routed and possibly pinched due to the top stack movement. It should be alternately appreciated, however, that a hydraulic actuator can be employed although various advantages of the preferred embodiment may not be achieved. An interior trim panel 308 internally covers at least part of actuator 300.

Figure 6:
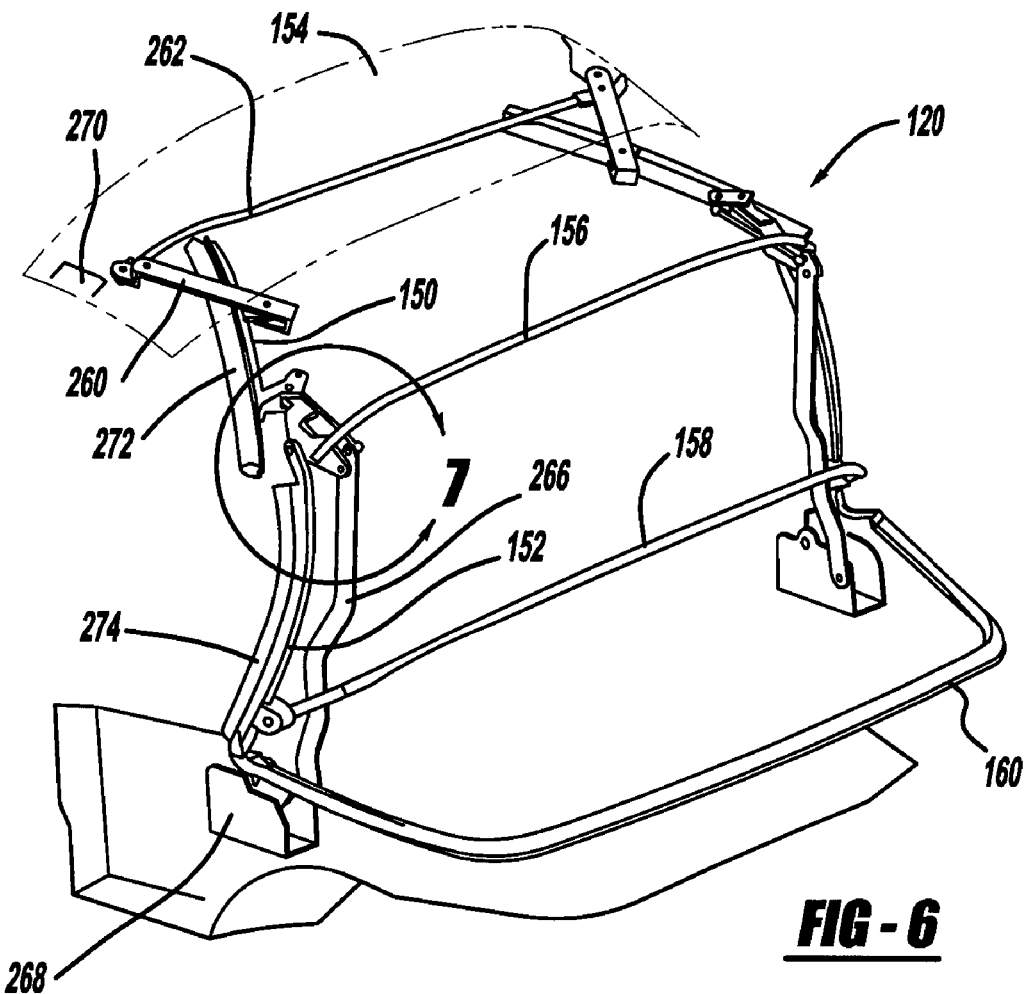
FIG. 6 is a rear perspective view showing the preferred convertible roof system, in a partially retracted position.
Figure 7:
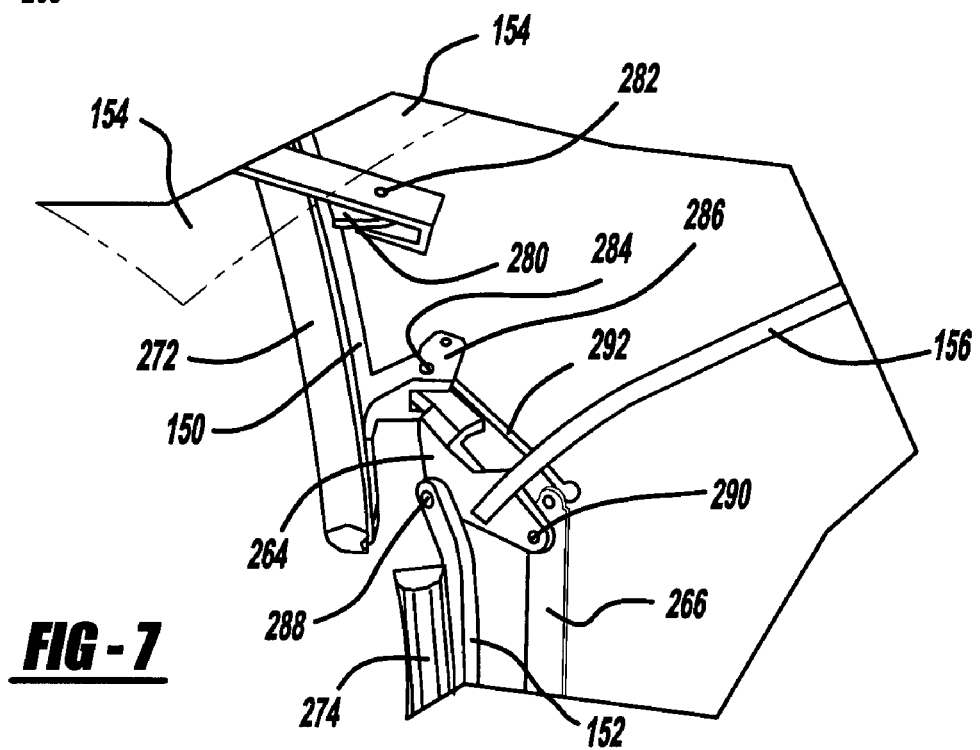
FIG. 7 is an enlarged perspective view, taken from FIG. 6, showing a C-joint employed in the preferred convertible roof system.
Figure 8:
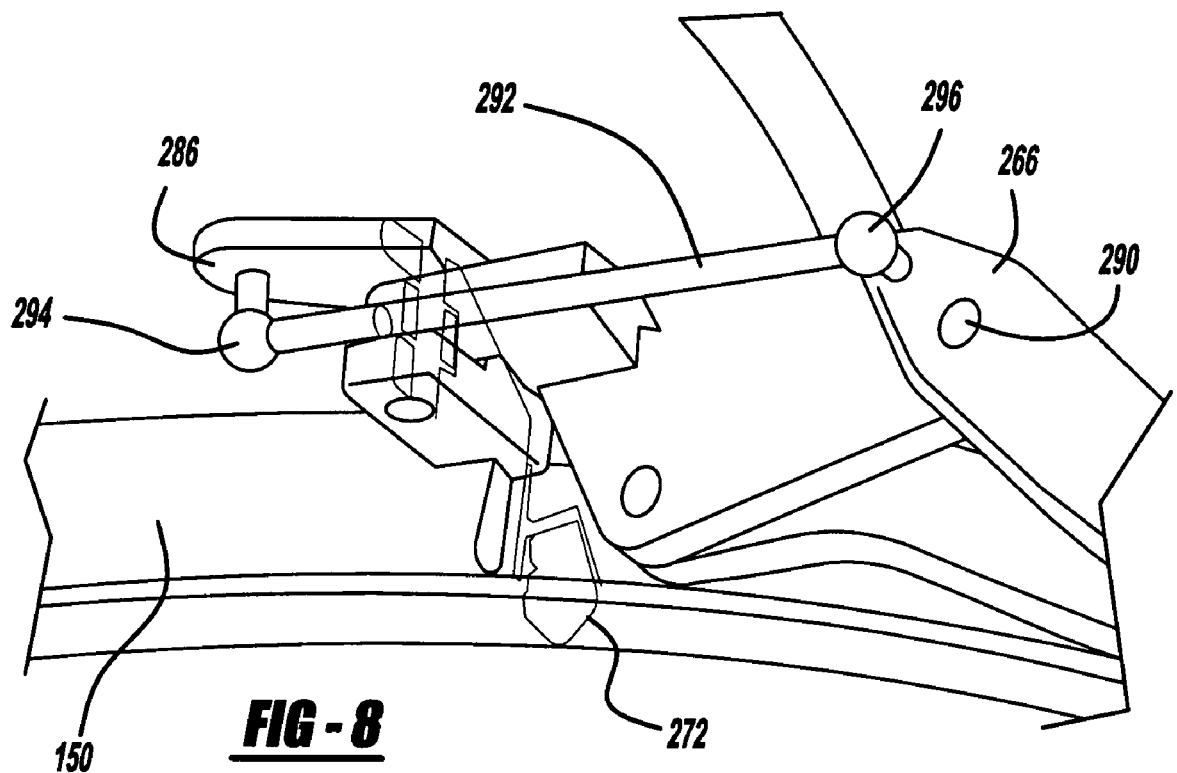
FIG. 8 is an enlarged perspective view, partially sectioned and taken opposite FIG. 7, showing the C-joint employed in the preferred convertible roof system.
Figure 9:
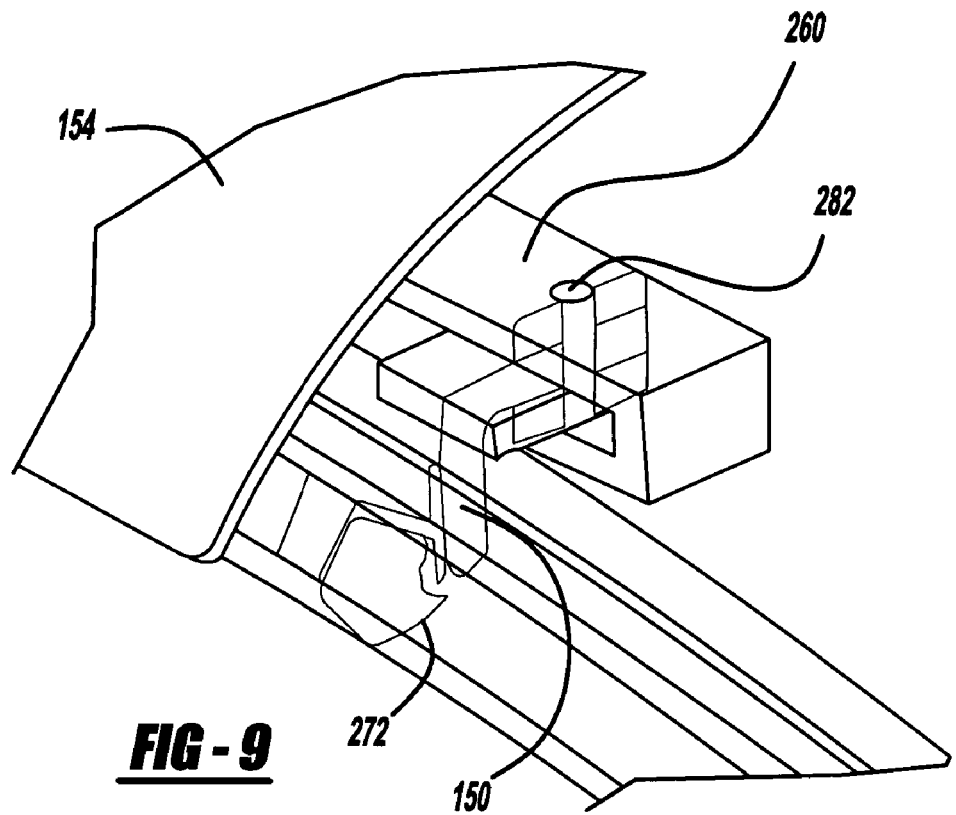
FIG. 9 is an enlarged perspective view, partially sectioned, showing a B-joint employed in the preferred convertible roof system.
Figure 10:
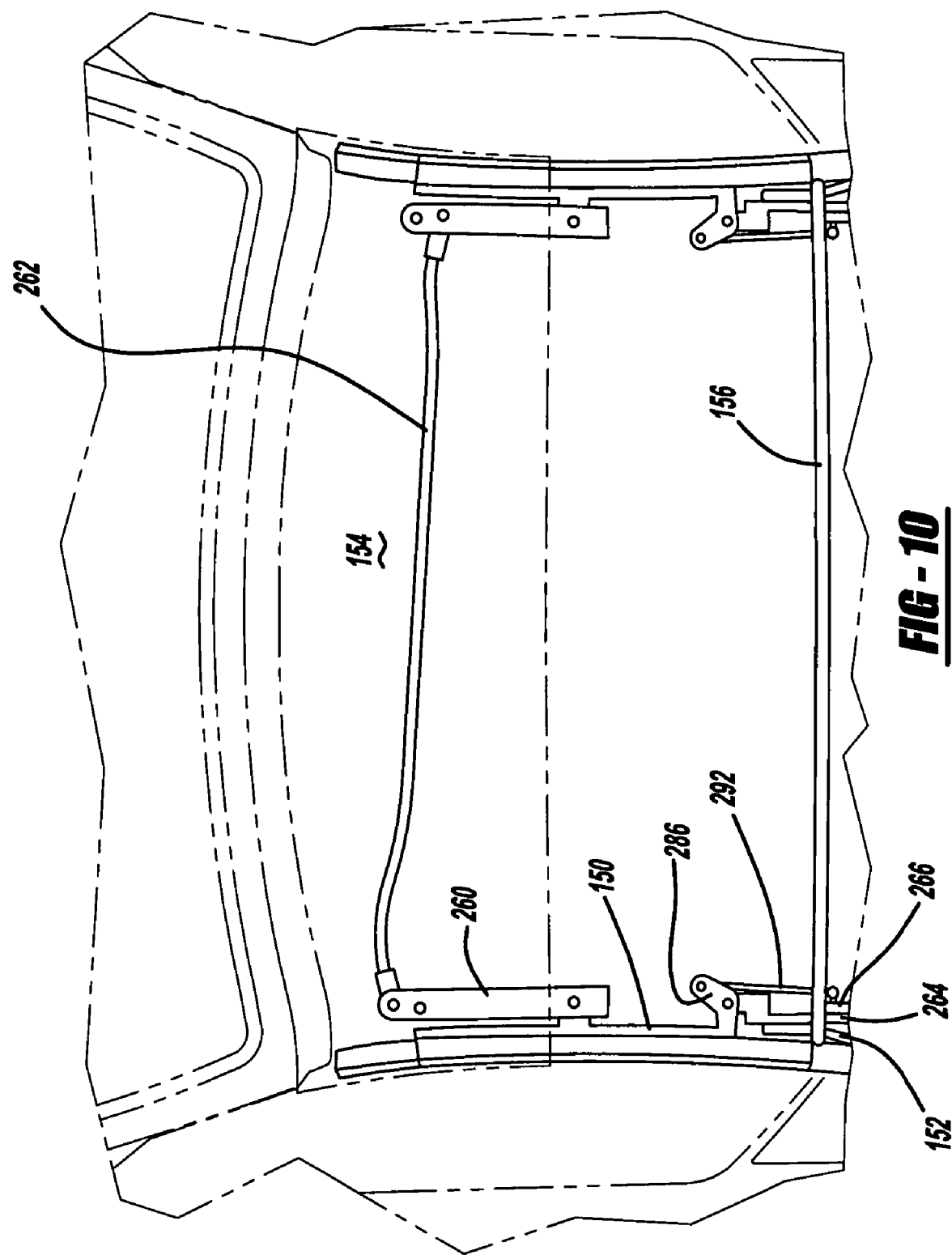
FIG. 10 is a diagrammatic top view showing the preferred convertible roof system, in the fully raised position.
Figure 11:
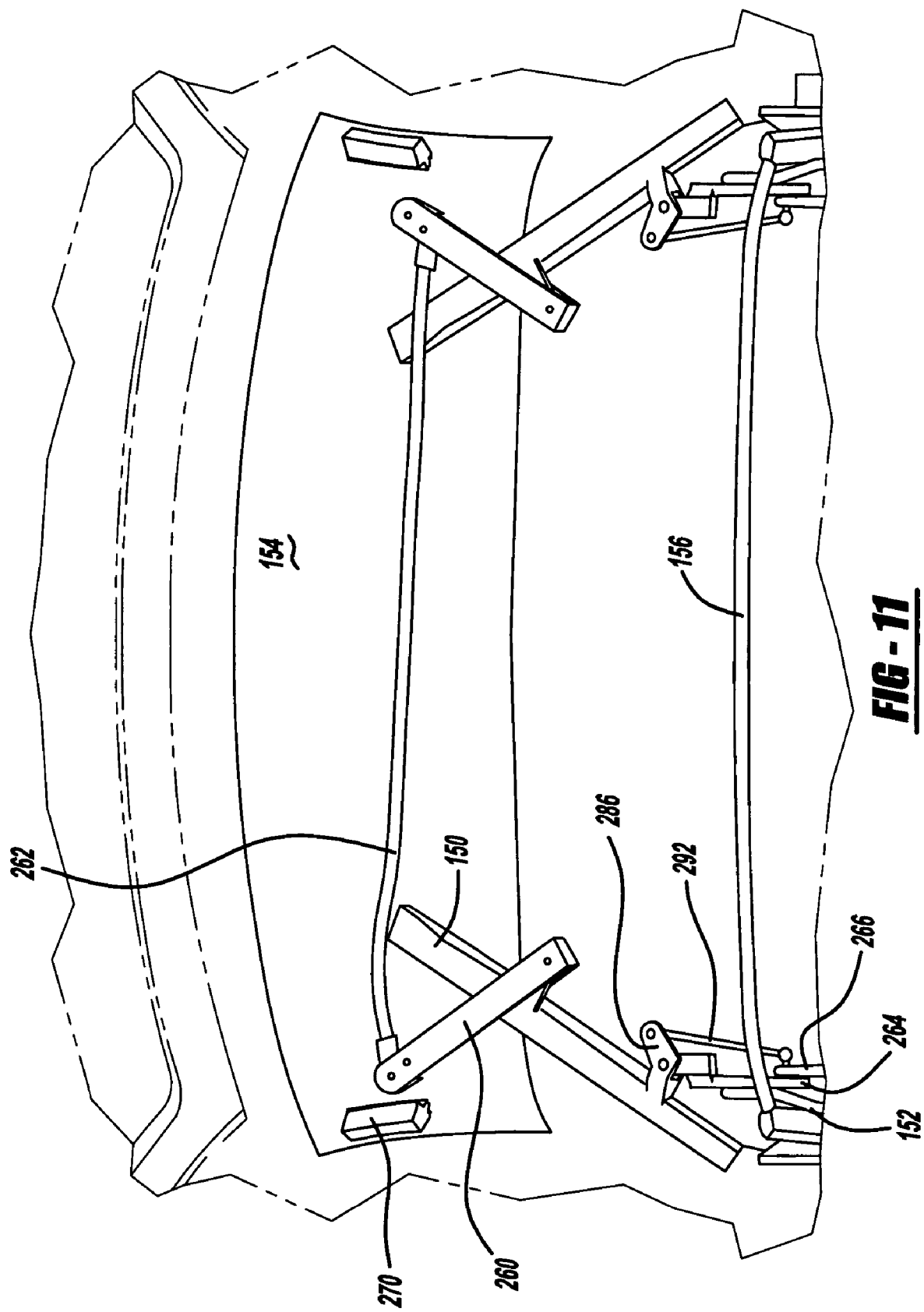
FIG. 11 is a diagrammatic top view showing the preferred convertible roof system, in the partially retracted position.

When the vehicle occupant actuates a button or switch to open convertible roof 120, an electronic control unit associated with the convertible roof will initially energize actuator 186 to cause front header latches 180 to disengage their front header panel receptacles and disengage contacting arms 220 (see FIGS. 3-5). Referring now to FIGS. 6, 7 and 15, the electronic control unit will thereafter energize main actuator 300 which causes upper ends of rear roof rails 152 to rearwardly and downwardly rotate about their lower pivots 302. Simultaneously, balance links 266 are passively rotated thereby, in turn, rearwardly pulling coupling links 292, which causes in-folding rotation of front side rails 272 and in-folding links 260. Moreover, the fore-and-aft distance between number one roof bow 154 and rear roof rails 152 are reduced and made significantly smaller due to this in-folding movement. This retraction and in-folding movement further causes clam-shell folding of the interior surface of number roof bow 154 generally against and facing an inside surface of rear roof rails 274. These clam-shelling and in-folding movements allow the exterior of convertible roof 120, here the roof cover fabric located on the exterior surface and upwardly facing portion of number one roof bow 154, to remain in an upwardly facing and exterior position even when stowed, such as is shown in FIGS. 12-14. Thus, this exterior forward portion of the convertible roof is self-covering and generally horizontal (allowing for some cross-vehicle and/or fore-and-aft styling curvature) when stowed.

Furthermore, a generally rigid roof storage cover 320, preferably a generally C-shaped (as viewed from the top) tonneau or boot cover, is movable from a raised position, as denoted by the phantom lines, to allow convertible roof movement into and out of roof storage area 126, to a fully closed position, as denoted by the solid lines, which covers sides and rear portions of the convertible roof when stowed. In this stowed position with tonneau cover 320 closed, a forward exterior portion of the convertible roof is still visible from outside the vehicle at least at the vehicular centerline. One exemplary tonneau cover is disclosed in U.S. Pat. No. 5,758,923 entitled "Folding Top for a Passenger Vehicle" which issued to Kolb on Jun. 2, 1998, and is incorporated by reference herein.

FIGS. 16 through 25 show an alternate embodiment of an in-folding convertible roof 20 according to the principals of the present disclosure. Convertible roof 20 is employed on an automotive vehicle 22 having a passenger compartment 24 and a generally unshaped boot well or stowage compartment 30. Convertible roof 20 is the type utilizing a folding or top stack mechanism 34 and a roof cover 36 (such as that shown in FIG. 1) and is operable between a fully raised position (see FIGS. 16 and 19) through intermediate positions (such as the positions shown in FIGS. 17, 20 and 23), to a fully stowed position (see FIGS. 18, 21 and 24). Another in-folding convertible roof is disclosed in U.S. patent application Ser. No. 11/034,608 entitled "Convertible Roof System with Dampening Device", filed Jan. 13, 2005, as well as U.S. patent application Ser. No. 11/035,318 entitled "In-Folding Convertible Roof" also filed Jan. 13, 2005. Both of these applications are incorporated by reference herein.

Roof cover 36 includes a hard or rigid portion 38 that, optionally, may be covered by the same material that comprises the soft portion of the cover to give a uniform appearance. A back light 39 is attached to roof cover 36 but is not pivotally coupled to top stack mechanism 34 through rigid links.

Top stack mechanism 34 includes a number one roof bow 44 extending transversely across vehicle 22 and disposed above the front windshield at or when in the fully raised position. Number one roof bow 44 is coupled to a pair of segmented roof rails 46 by a synchronizing linkage (not shown). The segmented roof rails 46 include an in-folding portion 46a and a straight-folding portion 46b. In-folding portion 46a is coupled to number one roof bow 44 in the manner described by the previously incorporated patent applications. In-folding and straight-folding portions 46a and 46b are pivotally connected together and are otherwise interconnected by in-folding linkage assemblies 52. Straight-folding portions 46b are pivotally coupled to the vehicle at a bracket 54.

A second top bow 56 is coupled to in-folding linkage assembly 52. A control link 58 extends substantially parallel to straight-folding portion 46b and is pivotally coupled at one end to in-folding linkage assembly 52. An opposite end of control link 58 is pivotally coupled to bracket 54 mounted to vehicle 22. A third bow 60 transversely extends across vehicle 22 and is mounted at its ends to straight-folding portions 46b. A rear bow 62 defines the aft edge of roof cover 36 (see FIG. 1) and extends transversely across vehicle 22. Each end of rear bow 62 is pivotally connected to brackets 54. Straight-folding portion 46b and control link 58, being pivotally connected to in-folding linkage assembly 52, control the motion of rigid portion 38 and in-folding portion 46a. Specifically, this linkage arrangement causes in-folding portion 46a to close in a "clam shell" manner relative to straight-folding portion 46b such that an upper outer surface 70 of rigid portion 38 remains facing in substantially the same orientation throughout movement of the roof assembly from the raised position to the stowed position. Furthermore, a leading edge 72 of rigid portion 38 remains forward relative to a rearward edge 74 of rigid portion 38 throughout movement of the convertible roof 20. Accordingly, aesthetically pleasing outer surface 70 (or the fabric roof cover thereon) functions as a cover for at least a portion of the top stack mechanism 34. At least a portion of the outer surface 70 (or the fabric roof cover thereon) is visible from an exterior location of vehicle 20 when the convertible roof is in the stowed position. Actuators may be coupled to any number of the components previously described to automatically actuate the convertible roof and automatically move the convertible roof between the stowed and raised positions.

While various aspects of the present invention have been disclosed, it should be appreciated that other variations are possible. For example, a hard-top front roof section (with or without a pliable exterior roof cover) and a soft-top rear roof section can employ some of the features of the present invention although all of the present advantages may not be fully realized. Furthermore, a soft-top roof cover can externally cover an underlying hard-top roof panel while employing some aspects of the present invention. A tonneau cover is not required and an automatically powered roof system is not required, however, many of the benefits of the present invention may not be achieved. It is alternately envisioned that the front header latching system and lock can be employed with other in-folding or out-folding convertible roofs. Moreover, additional, less or differently shaped links, side rails and joint couplings can be used although many advantages of the present invention may not be provided. It is intended by the following claims to cover these and any other departures from the disclosed embodiments that fall within the true spirit of the invention.

What is claimed is:

1. An automotive vehicle convertible roof system comprising:
   a number one roof bow;
   a front side rail movable in an in-folding manner during retraction;
   a front link coupling the front side rail to the number one roof bow, the front link having a front section rotatable in a substantially cross-vehicle direction relative to the number one roof bow;
   a rear side rail located adjacent to and aligned with the front side rail when in a raised orientation;
   a balance link;
   at least one intermediate link pivotably coupled to the front side rail, the rear side rail and the balance link;
   a main pivot bracket, a pivot of the rear side rail coupled to the main pivot bracket and a pivot of the balance link coupled to the main pivot bracket; and
   a ball-and-socket connector;
   the main pivot bracket, the rear side rail, the balance link and the at least one intermediate link acting as a four-bar mechanism;
   the ball-and-socket connector transferring in-folding motion to the front side rail from the balance link;
   the number one roof bow and front side rail clam-shell folding relative to the rear side rail during retraction;
   an exterior surface of the number one roof bow facing upwardly in both raised and retracted orientations; and
   a rigid cover automatically movable from a closed orientation at least partially covering a roof storage area to an open orientation to allow at least portions of the side rails to move into the roof storage area, the rigid cover only covering a rear portion but not a front portion of the number one roof bow at a vehicular centerline when the number one roof bow is retracted and the cover is in its closed orientation.

2. The convertible roof system of claim 1, further comprising a pliable roof cover covering the number one roof bow and a rigid back window attached to the pliable roof cover.

3. The convertible roof system of claim 1, further comprising weatherstrips attached to the side rails, and the front side rail operably rotating about a substantially vertical pivot axis attached to the at least one intermediate link.

4. The convertible roof system of claim 1, further comprising a roof bow stationarily attached to the at least one intermediate link which is a single link.

5. An automotive vehicle convertible roof system comprising:
   an outer roof movable between a raised position and a stowed position, the roof including an exterior roof surface;
   at least one side rail movable in a substantially cross-vehicular direction when operably moved between the raised and stowed positions;
   at least a front portion of the exterior roof surface being externally visible and substantially horizontal when the roof is clam-shell folded into the stowed position;
   an elongated balance link located substantially rearward of the side rail when in the raised position;
   a coupling link coupling the side rail to the balance link; and
   a roof bow stationarily attached to and movable with the coupling link.

6. The convertible roof system of claim 5, further comprising a rear roof rail, wherein the side rail is substantially aligned with the rear roof rail in a fore-and-aft manner when in the raised position, and the side rail is angularly offset from the rear roof rail along at least two different planes when in the stowed position.

7. An automotive vehicle convertible roof system comprising:
   an outer roof movable between a raised position and a stowed position, the roof including an exterior roof surface;
   at least one side rail movable in a substantially cross-vehicular direction when operably moved between the raised and stowed positions;
   at least a front portion of the exterior roof surface being externally visible and substantially horizontal when the roof is clam-shell folded into the stowed position; and
   a rear roof rail;
   wherein the side rail is substantially aligned with the rear roof rail in a fore-and-aft manner when in the raised position, and the side rail is angularly offset from the rear roof rail along at least two different planes when in the stowed position; and
   wherein the side rail operably rotates in the substantially cross-vehicular direction relative to the rear roof rail and there are only the two side rails carrying side window weatherstrips on each side of the roof.

8. An automotive vehicle convertible roof system comprising:
   an outer roof movable between a raised position and a stowed position, the roof including an exterior roof surface;
   at least one side rail movable in a substantially cross-vehicular direction when operably moved between the raised and stowed positions;
   at least a front portion of the exterior roof surface being externally visible and substantially horizontal when the roof is clam-shell folded into the stowed position;
   a rear roof rail, wherein the side rail is substantially aligned with the rear roof rail in a fore-and-aft manner when in the raised position, and the side rail is angularly offset from the rear roof rail along at least two different planes when in the stowed position; and
   at least one link rotatably coupled to the rear roof rail by a substantially cross-vehicle-elongated pivot axis, and the link being rotatably coupled to the side rail by a substantially vertical-elongated pivot axis.

9. The convertible roof system of claim 5, wherein the roof includes a soft-top cover.

10. An automotive vehicle convertible roof system comprising:
an outer roof movable between a raised position and a stowed position, the roof including an exterior roof surface and a soft-top cover;
at least one side rail movable in a substantially cross-vehicular direction when operably moved between the raised and stowed positions;
at least a front portion of the exterior roof surface being externally visible and substantially horizontal when the roof is clam-shell folded into the stowed position; and
a number one roof bow externally covered by the soft-top cover, the portion of the soft-top cover above the number one roof bow being the front portion of the exterior roof surface that is externally visible and substantially horizontal when in the stowed position, the number one roof bow being enlarged in a fore-and-aft direction to cover at least the front third of the side rail.

11. An automotive vehicle convertible roof system comprising:
an outer roof movable between a raised position and a stowed position, the roof including an exterior roof surface;
at least one side rail movable in a substantially cross-vehicular direction when operably moved between the raised and stowed positions;
at least a front portion of the exterior roof surface being externally visible and substantially horizontal when the roof is clam-shell folded into the stowed position; and
a rigid cover automatically movable from a closed orientation at least partially covering a roof storage area to an open orientation to allow the roof to move into the roof storage area during roof retraction;
the front portion of the roof at a centerline of the vehicle being visible and covering part of the roof storage compartment when the roof is in its stowed position and the rigid cover is in its closed orientation.

12. The convertible roof system of claim 11, further comprising:
an elongated balance link located substantially rearward of the side rail when in the raised position;
a coupling link coupling the side rail to the balance link; and
a roof bow stationarily attached to and movable with the coupling link.

13. The convertible roof system of claim 11, wherein the at least one side rail is part of an in-folding top stack mechanism, further comprising an automatic actuator operably driving the top stack mechanism and the attached roof between the raised and stowed positions.

14. An automotive vehicle convertible roof system comprising:
a top stack mechanism further comprising a number one roof bow, a balance link and a side rail, the top stack mechanism further comprising an elongated member rotatably coupled to the side rail and the balance link by ball joints;
the side rail moving in an in-folding manner when the top stack mechanism moves between a raised position and a stowed position;
the side rail rotating relative to the number one roof bow when moving in the in-folding manner; and the top stack mechanism collapsing in a clam-shell manner when moved from the raised position to the stowed position.

15. An automotive vehicle convertible roof system comprising:
a top stack mechanism further comprising a number one roof bow and a side rail;
the side rail moving in an in-folding manner when the top stack mechanism moves between a raised position and a stowed position;
the side rail rotating relative to the number one roof bow when moving in the in-folding manner;
the top stack mechanism collapsing in a clam-shell manner when moved from the raised position to the stowed position; and
a soft-top roof attached to and covering an upper surface of the number one bow when in the raised position, the soft-top roof at the upper surface of the number one bow being externally visible and upwardly facing when the top stack mechanism is in the stowed position.

16. The convertible roof system of claim 15, wherein the top stack mechanism further comprises a rear roof rail, the side rail operably rotating in a substantially cross-vehicular direction relative to the rear roof rail when the top stack mechanism is moved between the raised and stowed positions.

17. The convertible roof system of claim 16, wherein the top stack mechanism further comprises:
a balance link; and
a coupling link rotatably coupled to the rear roof rail at a substantially cross-vehicle-elongated pivot axis, the link being rotatably coupled to the side rail at a substantially vertical-elongated pivot axis, and the coupling link being rotatably coupled to the balance link.

18. The convertible roof system of claim 14, further comprising a soft-top roof attached to the top stack mechanism.

19. An automotive vehicle convertible roof system comprising:
a top stack mechanism further comprising a number one roof bow and a side rail;
the side rail moving in an in-folding manner when the top stack mechanism moves between a raised position and a stowed position;
the side rail rotating relative to the number one roof bow when moving in the in-folding manner;
the top stack mechanism collapsing in a clam-shell manner when moved from the raised position to the stowed position;
a rigid cover movable from a closed orientation at least partially covering a roof storage area to an open orientation to allow the top stack mechanism to move into the roof storage area during retraction of the top stack mechanism; and
a front portion of a roof outer surface at a centerline of the vehicle covering part of the roof storage compartment when the roof is in its stowed position and the rigid cover is in its closed orientation.

20. The convertible roof system of claim 19, further comprising:
an elongated balance link located substantially rearward of the side rail when in the raised position;
a coupling link coupling the side rail to the balance link; and
a roof bow directly attached to the coupling link.

21. The convertible roof system of claim 19, wherein the top stack mechanism includes a front link rotatably coupling the side rail to the number one bow, the front link being rotatable relative to both the number one bow and the side rail, and the front portion of the roof outer surface at the centerline of the vehicle is visible when in its stowed position and the rigid cover is in its closed orientation.

22. The convertible roof system of claim 14, further comprising:
a pair of front header latches coupled to and retractable with the number one bow;
a single latch actuator operably moving the pair of latches and being located substantially between the pair of latches on the number one bow; and
an automatic roof actuator operably driving the top stack mechanism between the raised and stowed positions;
wherein at least a majority of the latches and the latch actuator is substantially hidden from view by the number one bow when the top stack mechanism is in its stowed position.

23. An automotive vehicle convertible roof system comprising:
a pliable roof cover;
a forwardmost roof bow having an upper surface covered by the pliable roof cover when in a raised position;
a first side window weatherstrip;
a first elongated member rotatably coupled to the forwardmost roof bow, the first elongated member being rotatable in a substantially cross-vehicle direction, and the first side window weatherstrip being attached to the first elongated member;
a main pivot bracket;
a second side window weatherstrip;
a second elongated member rotatably attached to the main pivot bracket, the first elongated member being rotatably coupled to the second elongated member, the elongated members being adjacent to and substantially aligned with each other when in the raised position, and the second weatherstrip being attached to the second elongated member; and
an inside of the forwardmost roof bow substantially facing an inside of the second elongated member when in a stowed position.

24. The convertible roof system of claim 23, further comprising at least one link rotatably coupled to the second elongated member by a substantially cross-vehicle-elongated pivot axis, and the link being rotatably coupled to the first elongated member by a substantially vertical-elongated pivot axis.

25. The convertible roof system of claim 23, further comprising:
an elongated balance link located substantially rearward of the second elongated member when in the raised position;
a coupling link coupling the first elongated member to the balance link; and
a roof bow directly attached to and movable with the coupling link.

26. The convertible roof system of claim 23, further comprising:
a rigid cover automatically movable from a closed orientation at least partially covering a roof storage area to an open orientation to allow the roof cover to move into the roof storage area during roof cover retraction; and
a front portion of the roof cover at a centerline of the vehicle being visible and covering part of the roof storage compartment when the roof cover is in its stowed position and the rigid cover is in its closed orientation.

27. The convertible roof system of claim 23, wherein the first elongated member is a front side rail which is part of an in-folding top stack mechanism, the system further comprising an automatic actuator operably driving the top stack mechanism and the attached roof cover between the raised and stowed positions.

28. The convertible roof system of claim 23, wherein the second elongated member is a rear roof rail, the system further comprising:
a coupler link including a pair of ball joints;
a balance link having a proximal end pivotably connected to the main pivot bracket and a distal end; and
an automatic actuator operably driving at least one of the rear roof rail and the balance link;
the coupler link operably transferring in-folding motion from the balance link to the first elongated member.

29. The convertible roof system of claim 28, further comprising an in-folding base bracket, wherein a four-bar mechanism is defined by the main pivot bracket, the second elongated member which is a rear side rail, the balance link and the in-folding base bracket.

30. An automotive vehicle convertible roof system comprising:
a top stack mechanism movable from a raised position to a stowed position, the top stack mechanism further comprising a forwardmost roof bow and an elongated member;
the elongated member being elongated in a substantially fore-and-aft direction when the top stack mechanism is in the raised position;
the elongated member being coupled to the forwardmost roof bow;
the elongated member being rotatable in a substantially cross-vehicle direction relative to the forwardmost roof bow when the top stack mechanism is moved from the raised position to the stowed position;
a front header latch coupled to the forwardmost roof bow; and
a contacting arm movable at least partially simultaneously with the header latch, the contacting member operably rotating from an inboard position disengaged from the elongated member to an outboard position engaging the elongated member.

31. The convertible roof system of claim 30, further comprising an actuator, and at least a crank coupling the latch to the contacting arm and the actuator.

32. The convertible roof system of claim 30, further comprising an elongated rod coupling the contacting member to the crank, and a link coupling the header latch to the crank, the header latch being rotatable relative to the forward most roof bow.

33. The convertible roof system of claim 30, further comprising a single first automatic actuator mounted to the forwardmost roof bow and operably driving both the header latch and the contacting arm, and at least a second automatic actuator operably driving the top stack mechanism.

34. The convertible roof system of claim 30, wherein the top stack mechanism folds in an in-folding manner and placement of the contacting arm into the outboard position deters in-folding of the elongated member.

35. A method of operating a convertible roof in an automotive vehicle, the method comprising:
(a) moving the convertible roof from a raised position to a stowed position;
(b) in-folding a front side rail relative to a forwardmost roof bow during step (a);
(c) clam-shell folding the convertible roof during step (a);

(d) causing an exterior surface of the convertible roof above the forwardmost roof bow to be upwardly facing when in both the raised and stowed positions;

(e) moving a rigid storage area cover from an open orientation to a closed orientation;

(f) hiding only a rear portion of the exterior surface of the convertible roof above the forwardmost roof bow with the storage area cover at a vehicular centerline when the convertible roof is in its stowed position and the storage area cover is in its closed orientation; and (g) allowing a front portion of the exterior surface of the convertible roof to be visible from outside the vehicle after step (b).

36. The method of claim 35, further comprising powering an actuator to move the convertible roof between its raised and stowed positions and causing an electronic control unit to energize another actuator to move front header latches.

37. The method of claim 35, wherein the convertible roof further comprises a pliable cover attached to the forwardmost roof bow and defining the exterior surface, and moving the convertible roof with a powered actuator.

38. The method of claim 35, further comprising clam-shell folding a front side rail relative to a rear side rail, and placing the rear side rail directly behind the front side rail when in the raised position.

39. The convertible roof system of claim 19, further comprising:

a rear roof rail, the side rail being substantially aligned with the rear roof rail in a fore-and-aft manner when in the raised position, and the side rail being angularly offset from the rear roof rail along at least two different planes when in the stowed position;

a weatherstrip attached to the side rail;

a balance link;

at least one intermediate link coupling the side roof rail to the rear roof rail and the balance link; and the front side rail operably rotating about a substantially vertical pivot axis attached to the at least one intermediate link.

* * * * *

UNITED STATES PATENT AND TRADEMARK OFFICE
CERTIFICATE OF CORRECTION

| | | |
|---|---|---|
| PATENT NO. | : 7,690,716 B2 | Page 1 of 1 |
| APPLICATION NO. | : 11/805404 | |
| DATED | : April 6, 2010 | |
| INVENTOR(S) | : Christopher J. Dilluvio | |

It is certified that error appears in the above-identified patent and that said Letters Patent is hereby corrected as shown below:

Column 1, line 17, "from it" should be --from its--.

Column 3, line 41, after "of", delete "a".

Column 5, line 49, after "number", insert --one--.

Column 6, line 7, "principals" should be --principles--.

Column 6, line 10, "unshaped" should be --u-shaped--.

Signed and Sealed this
First Day of March, 2011

David J. Kappos
*Director of the United States Patent and Trademark Office*